US012092255B2

(12) United States Patent
Giles et al.

(10) Patent No.: US 12,092,255 B2
(45) Date of Patent: *Sep. 17, 2024

(54) SEAL ASSEMBLY FOR PIPELINE ISOLATION TOOL AND METHODS OF USE

(71) Applicant: TDW Delaware, Inc., Wilmington, DE (US)

(72) Inventors: Paul Giles, Houston, TX (US); Humon Glenn Fardsalehi, Houston, TX (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,947

(22) Filed: Mar. 6, 2023

(65) Prior Publication Data

US 2023/0204144 A1    Jun. 29, 2023

Related U.S. Application Data

(63) Continuation of application No. 17/390,709, filed on Jul. 30, 2021, now Pat. No. 11,598,471.

(60) Provisional application No. 63/058,829, filed on Jul. 30, 2020.

(51) Int. Cl.
*F16L 55/136* (2006.01)
*F16L 55/11* (2006.01)
*F16L 55/128* (2006.01)

(52) U.S. Cl.
CPC .............. *F16L 55/136* (2013.01); *F16L 55/11* (2013.01); *F16L 55/1125* (2013.01); *F16L 55/1283* (2013.01)

(58) Field of Classification Search
CPC . F16L 55/136; F16L 55/1283; F16L 55/1125; F16L 55/11
USPC ................................................ 138/92, 94, 89
See application file for complete search history.

(56) References Cited

U.S. PATENT DOCUMENTS

| | | | | |
|---|---|---|---|---|
| 779,388 | A | * | 1/1905 | Barnes .................. E21B 33/134 166/135 |
| 1,794,662 | A | * | 3/1931 | Zerr ........................ E21B 33/06 285/123.4 |
| 2,780,294 | A | * | 2/1957 | Loomis ............... E21B 33/1216 277/339 |
| 4,465,104 | A | * | 8/1984 | Wittman ............. F16L 55/1283 405/170 |
| 4,854,384 | A | * | 8/1989 | Campbell ............... F16L 55/32 166/134 |
| 4,991,651 | A | * | 2/1991 | Campbell ............... F16L 55/32 138/97 |

(Continued)

*Primary Examiner* — Patrick F Brinson
(74) *Attorney, Agent, or Firm* — GableGotwals

(57) ABSTRACT

A seal assembly for a pipeline plug may include a pressure head including a forcing face. The seal assembly may include a primary tapered ring including an expansion face. The expansion face may abut the forcing face. The seal assembly may include primary seal ring. The seal assembly may include a squeezer assembly, the squeezer assembly including at least one seal face, the seal face abutting the primary seal ring. The seal assembly may include a secondary tapered ring, the secondary tapered ring including a wedge squeezer face, the wedge squeezer face abutting a wedge face of the squeezer assembly. The seal assembly may include a bowl, the bowl including a wedge face, the wedge face in abutment with an expansion face of the secondary tapered ring.

30 Claims, 28 Drawing Sheets

(56) References Cited

U.S. PATENT DOCUMENTS

| | | | |
|---|---|---|---|
| 11,359,756 B1* | 6/2022 | Giles | F16L 55/1283 |
| 11,359,757 B2* | 6/2022 | Giles | F16L 55/136 |
| 11,598,471 B2* | 3/2023 | Giles | F16L 55/136 |
| 11,708,929 B2* | 7/2023 | Giles | F16L 55/136 |
| | | | 138/89 |
| 2002/0101040 A1* | 8/2002 | Russell | F16L 55/136 |
| | | | 285/305 |
| 2005/0241710 A1* | 11/2005 | Early | F16L 55/1283 |
| | | | 138/89 |
| 2010/0032044 A1* | 2/2010 | Mellemstrand | F16L 55/1283 |
| | | | 138/89 |
| 2010/0051130 A1* | 3/2010 | Syse | F16L 55/136 |
| | | | 138/97 |
| 2014/0020782 A1* | 1/2014 | Early | F16L 55/1283 |
| | | | 138/89 |
| 2018/0023366 A1* | 1/2018 | Deng | E21B 33/1216 |
| | | | 277/339 |
| 2019/0107239 A1* | 4/2019 | Bjorsvik | F16J 15/46 |

* cited by examiner

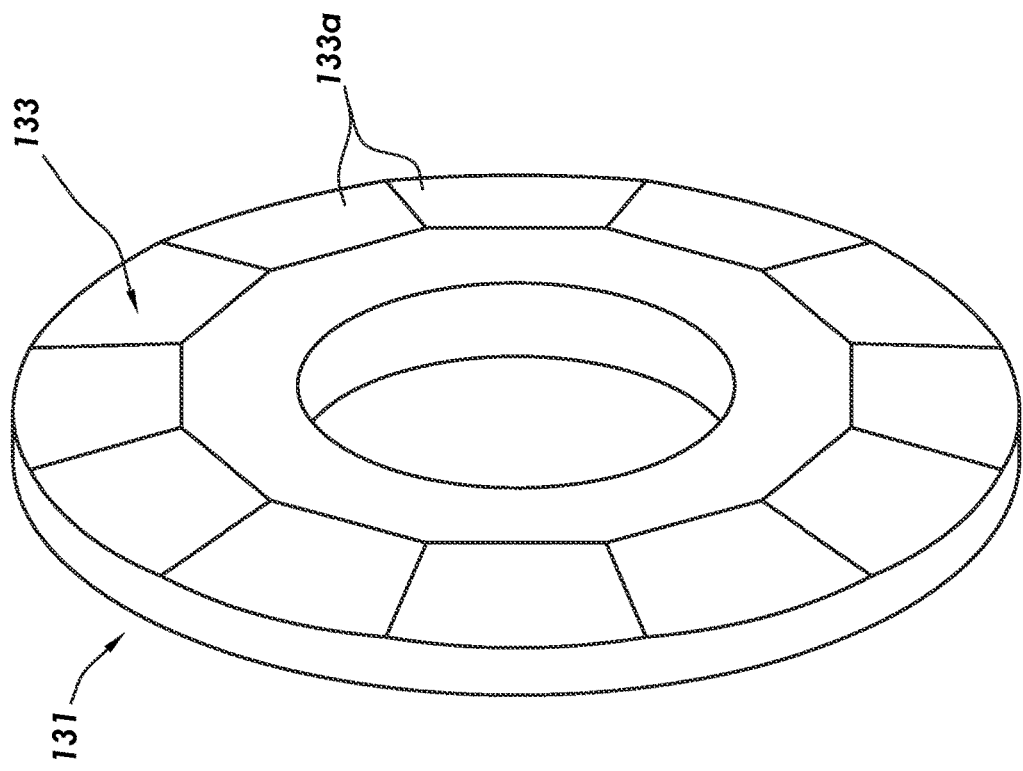
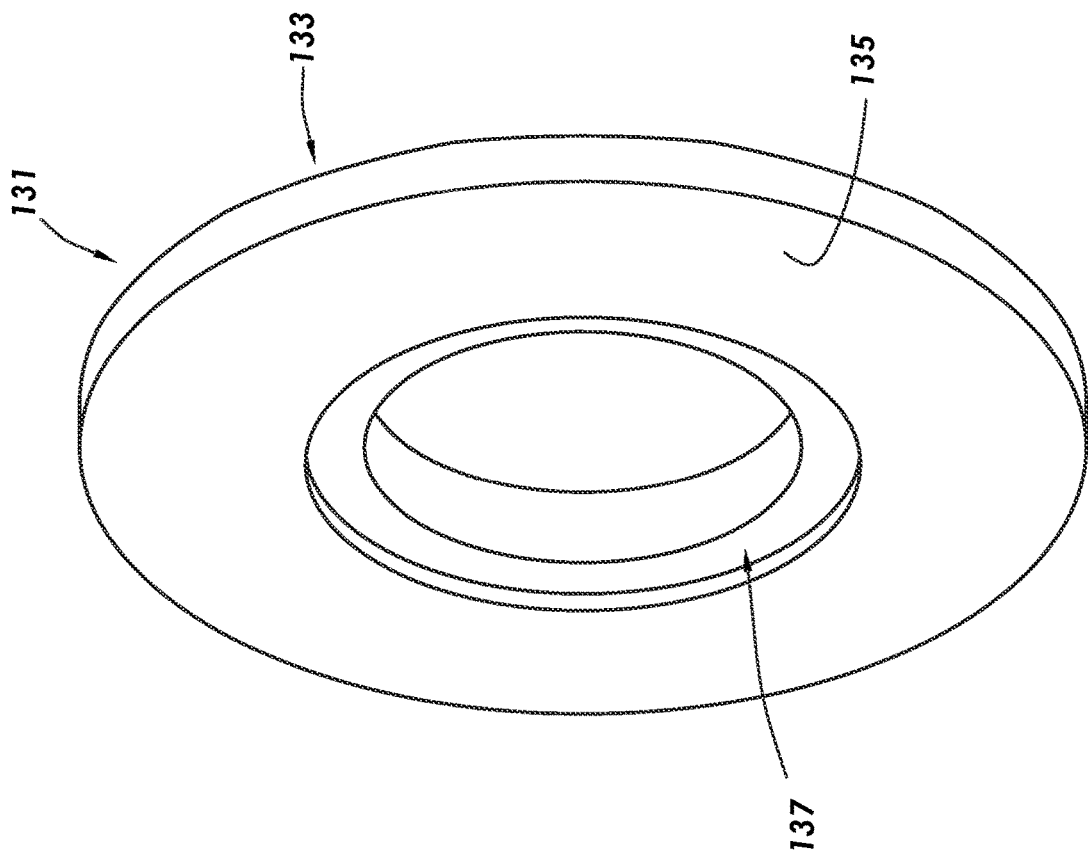

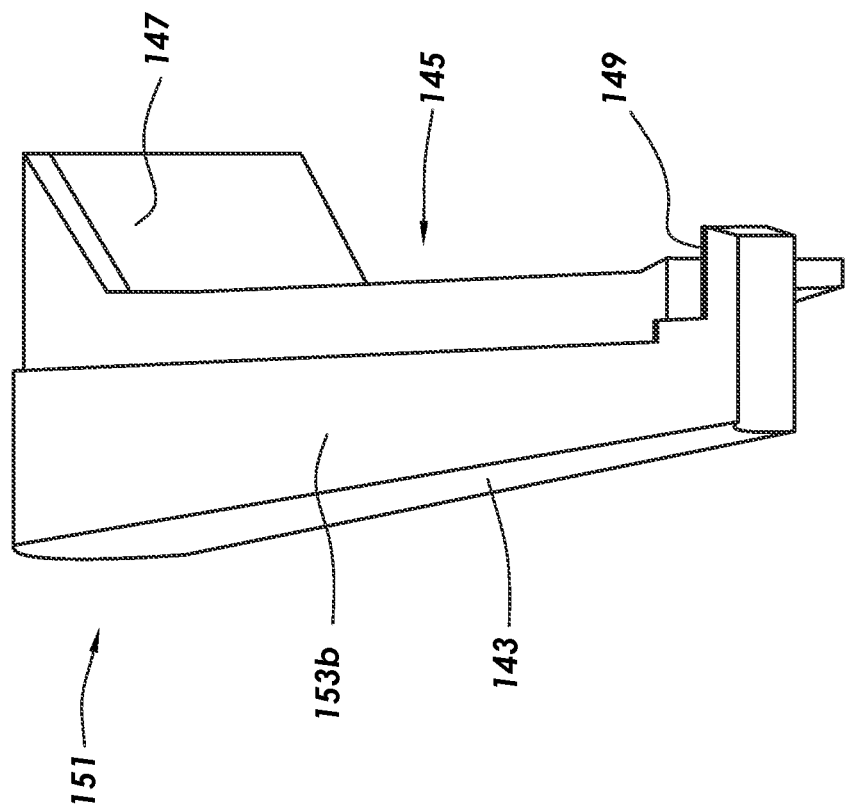
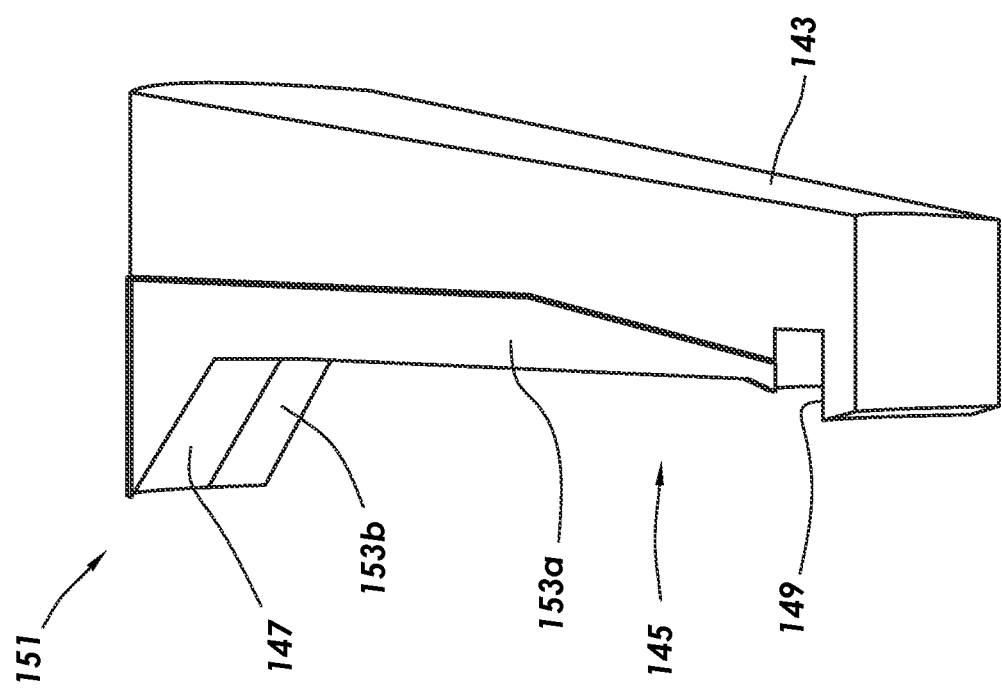
FIG. 7D
FIG. 7C

SEAL ASSEMBLY FOR PIPELINE ISOLATION TOOL AND METHODS OF USE

CROSS-REFERENCE TO RELATED APPLICATIONS

This application is a continuation application which claims priority from U.S. utility application Ser. No. 17/390,709, filed Jul. 30, 2021, which is itself nonprovisional application which claims priority from U.S. provisional application No. 63/058,829, filed Jul. 30, 2020, each of which is incorporated by reference herein in its entirety.

TECHNICAL FIELD/FIELD OF THE DISCLOSURE

The present disclosure relates generally to pipeline tools and specifically to pipeline isolation tools.

BACKGROUND OF THE DISCLOSURE

Pipelines are used to transport liquids and gases over long distances. In some circumstances, a section of the pipeline needs to be isolated from pressure and fluids within the rest of the pipeline. For example, such isolation may be needed while undertaking planned maintenance or emergency repair of the pipeline or equipment associated with the pipeline such as valves. Additionally, such isolation may be needed while pressure testing certain sections of the pipeline.

When isolation of the pipeline is needed, one or more pipeline plugs may be introduced into the pipeline and moved to the desired isolation position. The pipeline plug may be introduced inline and moved through the pipeline to a desired position or may be introduced intrusively through an opened section of the pipeline. Once in position, the pipeline plug may be actuated such that plug fluidly isolates the section of the pipeline on one side of the pipeline plug from the section of the pipeline on the other side of the pipeline plug.

SUMMARY

The present disclosure provides for a seal assembly. The seal assembly may include a pressure head including a forcing face. The seal assembly may include a primary tapered ring including an expansion face. The expansion face may abut the forcing face. The seal assembly may include primary seal ring. The seal assembly may include a squeezer assembly, the squeezer assembly including at least one seal face, the seal face abutting the primary seal ring. The seal assembly may include a secondary tapered ring, the secondary tapered ring including a wedge squeezer face, the wedge squeezer face abutting a wedge face of the squeezer assembly. The seal assembly may include a bowl, the bowl including a wedge face, the wedge face in abutment with an expansion face of the secondary tapered ring.

The present disclosure also provides for a pipeline plug. The pipeline plug may include a plug body, the plug body being tubular. The pipeline plug may include an actuation mechanism, the actuation mechanism including a fixed head and a moveable head, the fixed head coupled to the plug body. The pipeline plug may include a seal assembly positioned about the plug body between the fixed head and the movable head. The seal assembly may include a pressure head including a forcing face. The seal assembly may include a primary tapered ring including an expansion face. The expansion face may abut the forcing face. The seal assembly may include primary seal ring. The seal assembly may include a squeezer assembly, the squeezer assembly including at least one seal face, the seal face abutting the primary seal ring. The seal assembly may include a secondary tapered ring, the secondary tapered ring including a wedge squeezer face, the wedge squeezer face abutting a wedge face of the squeezer assembly. The seal assembly may include a bowl, the bowl including a wedge face, the wedge face in abutment with an expansion face of the secondary tapered ring.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 6, 6A depict perspective views of a pressure head of the seal assembly of FIG. 5.

FIGS. 7C, 7D depict end views of a primary tapered ring segment of the primary tapered ring of FIG. 7.

DETAILED DESCRIPTION

Figure 1:
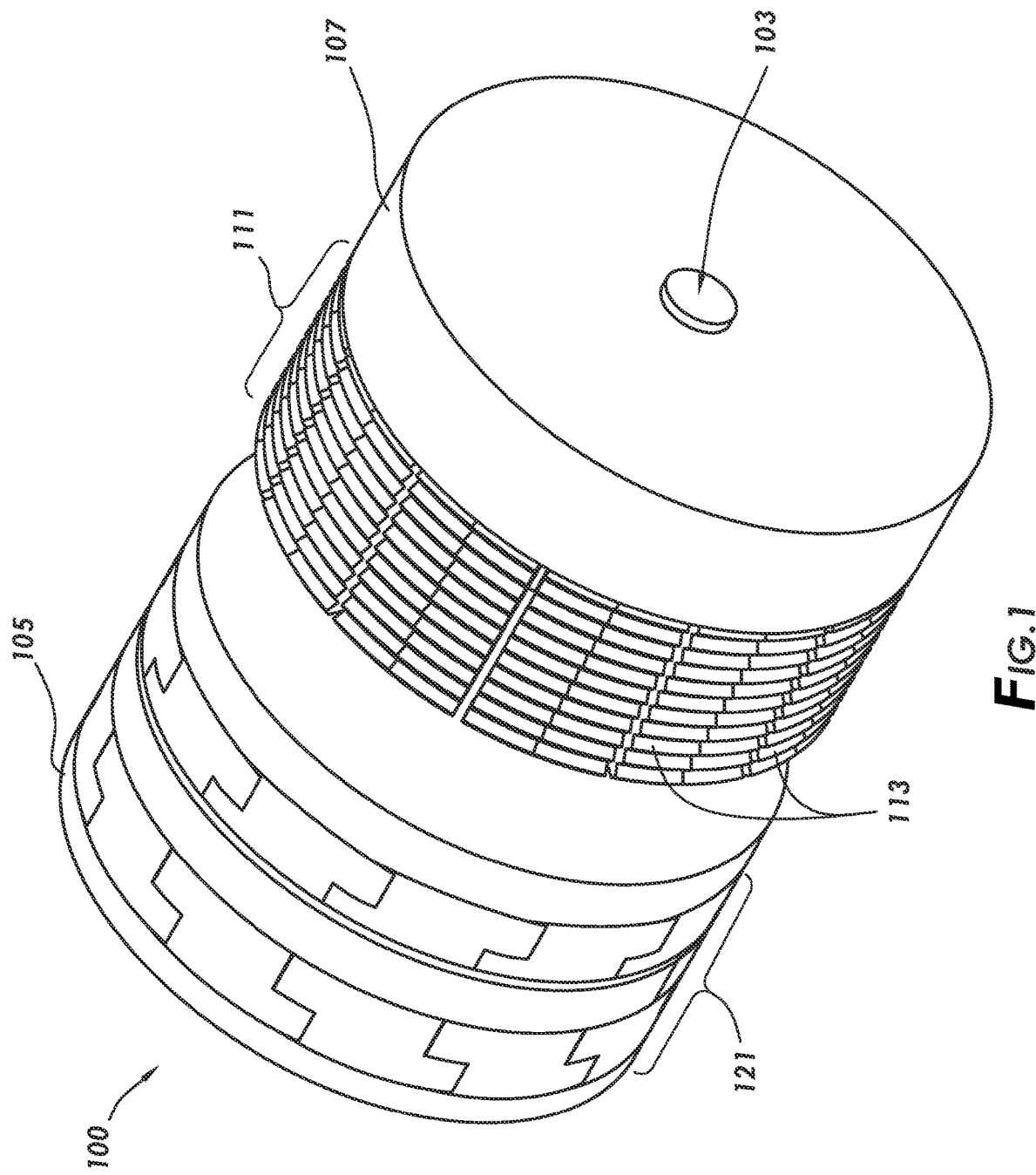
FIG. 1 depicts a perspective view of a pipeline plug consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
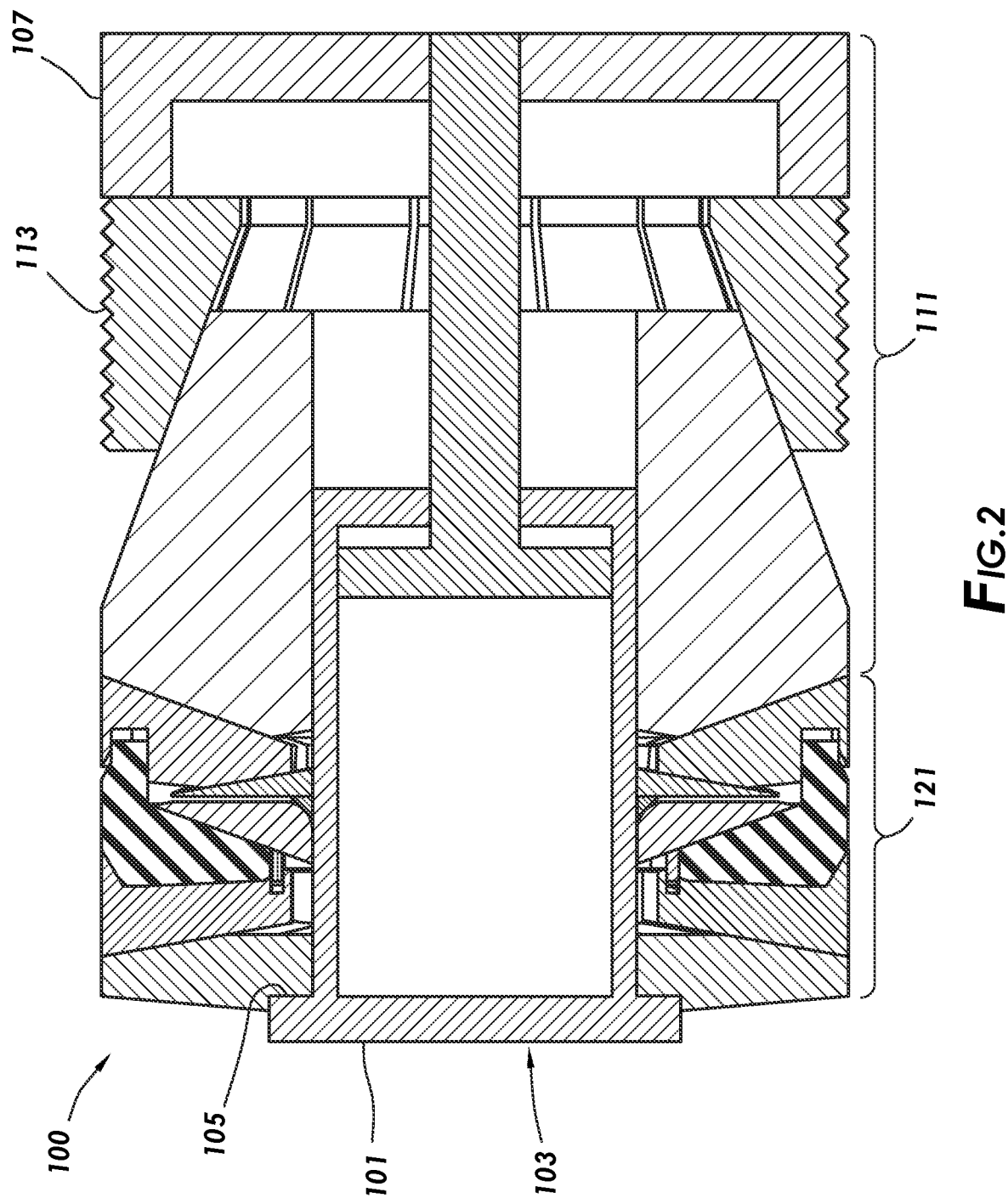
FIG. 2 depicts a cross section view of a pipeline plug including a seal assembly consistent with at least one embodiment of the present disclosure.

FIGS. 1 and 2 depict pipeline plug 100 consistent with at least one embodiment of the present disclosure. In some embodiments, pipeline plug 100 may include plug body 101. Plug body 101 may be generally tubular. In some embodiments, pipeline plug 100 may include actuation mechanism 103. Actuation mechanism 103 may include fixed head 105 and movable head 107. In some embodiments, fixed head 105 may be formed as part of or coupled to plug body 101. In some embodiments, movable head 107 may be movable relative to fixed head 105 by, for example and without limitation, hydraulic pressure, pneumatic pressure, or electromechanically. In some embodiments, actuation mechanism 103 may be at least partially positioned within plug body 101.

In some embodiments, pipeline plug 100 may include gripper assembly 111. Gripper assembly 111 may be annular or tubular in shape and may be positioned about plug body 101. Gripper assembly 111 may be used to maintain the position of pipeline plug 100 within a pipeline. Gripper assembly 111 may include one or more gripping elements 113 that extend radially outward into engagement with the pipeline when in an actuated position as discussed further herein below.

In some embodiments, pipeline plug 100 may include seal assembly 121. Seal assembly 121 may be annular or tubular and may be positioned about plug body 101. When actuated, seal assembly 121 may engage the pipeline such that seal assembly 121 fluidly isolates the section of the pipeline on one side of seal assembly 121 from the section of pipeline on the other side of seal assembly 121 as further described herein below.

In some embodiments, actuation mechanism 103 may be used to actuate seal assembly 121 and, in some embodiments, gripper assembly 111. In some embodiments, movement of movable head 107 may longitudinally compress seal assembly 121 and, in some embodiments, gripper assembly 111 as further described below.

Figure 3:
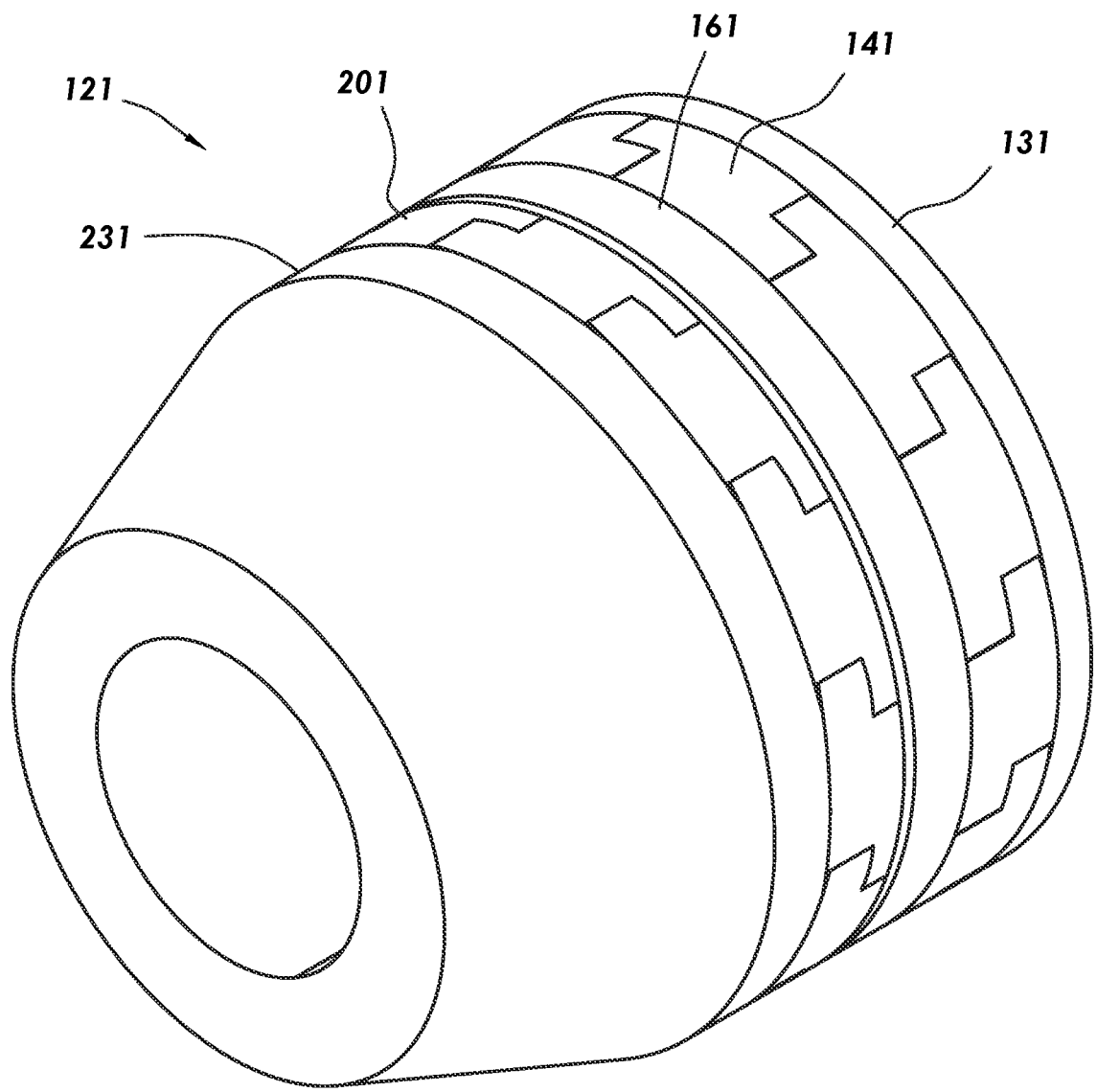
FIG. 3 depicts a perspective view of a seal assembly consistent with at least one embodiment of the present disclosure.
Figure 4:
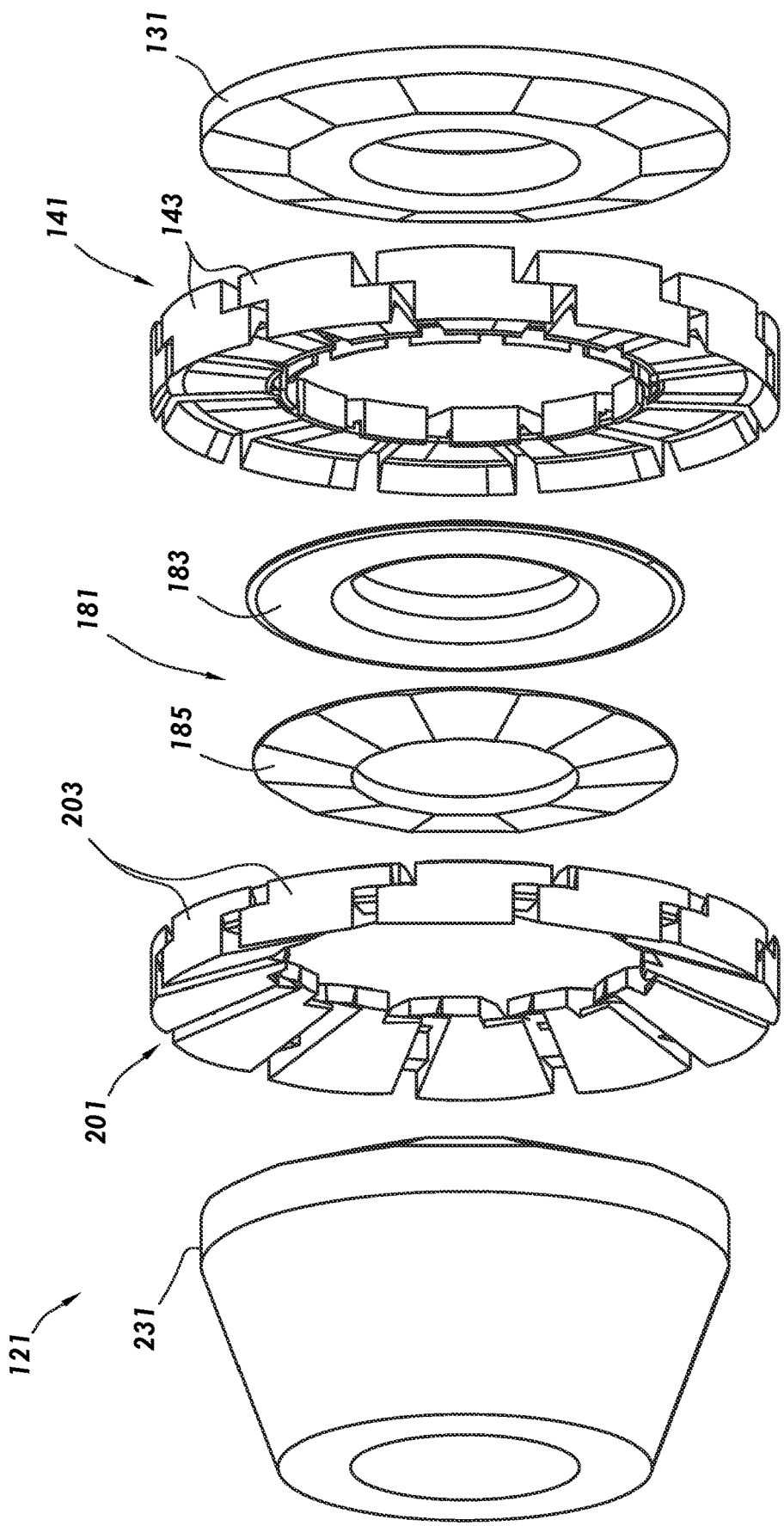
FIG. 4 depicts an exploded view of the seal assembly of FIG. 3.
Figure 5:
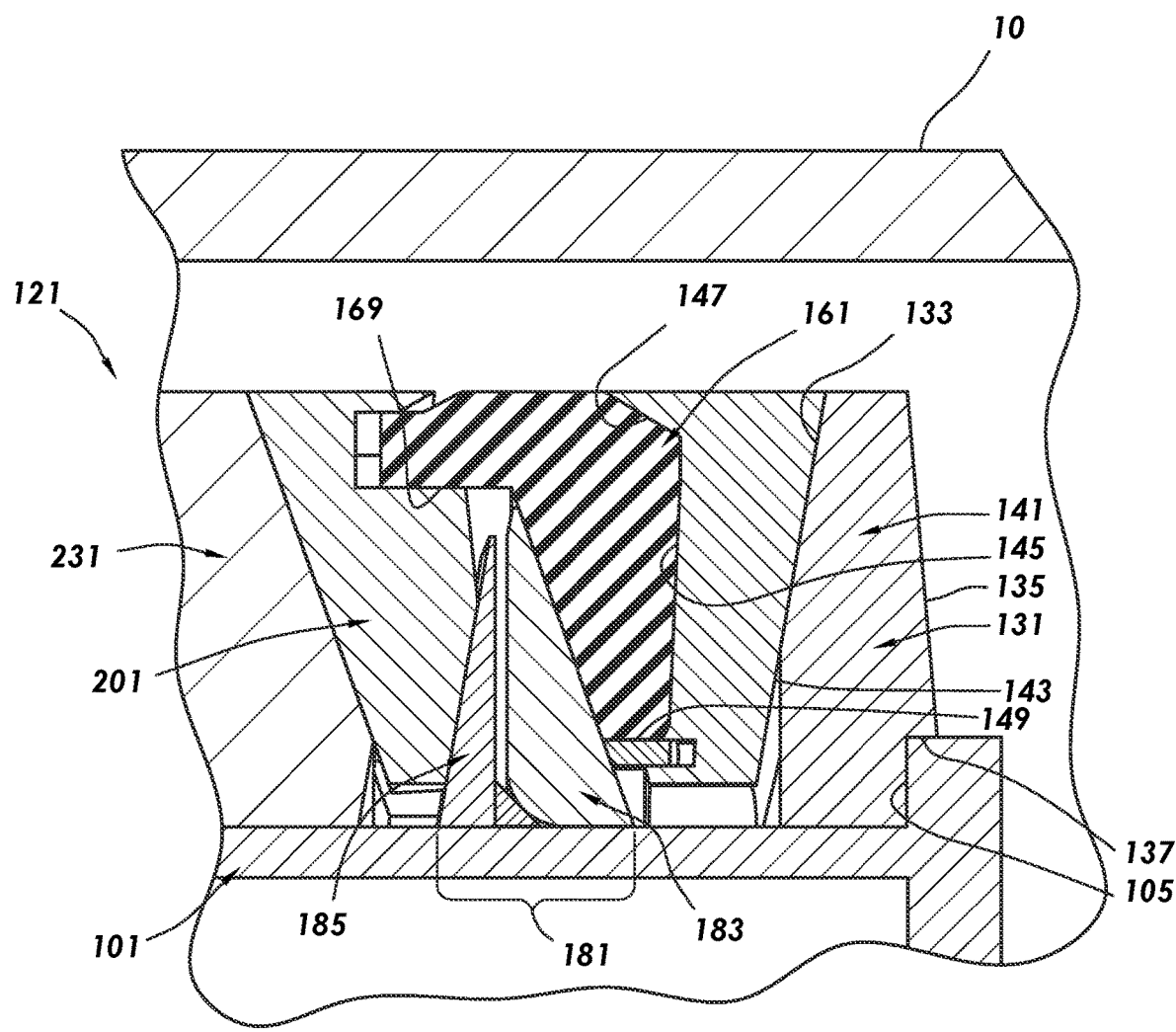
FIG. 5 depicts a detail cross section view of a seal assembly consistent with at least one embodiment of the present disclosure in a run-in configuration.

FIGS. 3-5 depict seal assembly 121 consistent with at least one embodiment of the present disclosure. In some embodiments, seal assembly 121 may include pressure head 131, primary tapered ring 141, primary seal ring 161, squeezer assembly 181, secondary tapered ring 201, and bowl 231. In some embodiments, each of pressure head 131, primary tapered ring 141, primary seal ring 161, squeezer assembly 181, secondary tapered ring 201, and bowl 231 may be annular or tubular and may be positioned about plug body 101. In some embodiments, pressure head 131, primary tapered ring 141, primary seal ring 161, squeezer assembly 181, secondary tapered ring 201, and bowl 231 may be in abutment such that primary seal ring 161 is extended radially into contact with pipeline 10 (as shown in FIG. 5) when bowl 231 is longitudinally biased toward pressure head 131 as further discussed below.

In some embodiments, as shown in FIGS. 5, 6, 6A, pressure head 131 may be annular or tubular in shape. Pressure head 131 may include forcing face 133, defined as the face of pressure head 131 in engagement with primary tapered ring 141, and reverse face 135, defined as the face opposite forcing face 133. In some embodiments, reverse face 135 of pressure head 131 may be engaged to fixed head 105 of actuation mechanism 103 such that fixed head 105 restricts longitudinal motion of pressure head 131 along plug body 101 past fixed head 105. In some embodiments, fixed head 105 may be formed as an external flange on an end of plug body 101. In some such embodiments, reverse face 135 of pressure head 131 may include slot 137 positioned to receive fixed head 105. In some embodiments, slot 137 may be formed to correspond to the profile of fixed head 105. In some such embodiments, for example and without being bound to theory, by mating fixed head 105 within slot 137, the stiffness of pressure head 131 under bending load may be increased.

Figure 6B:
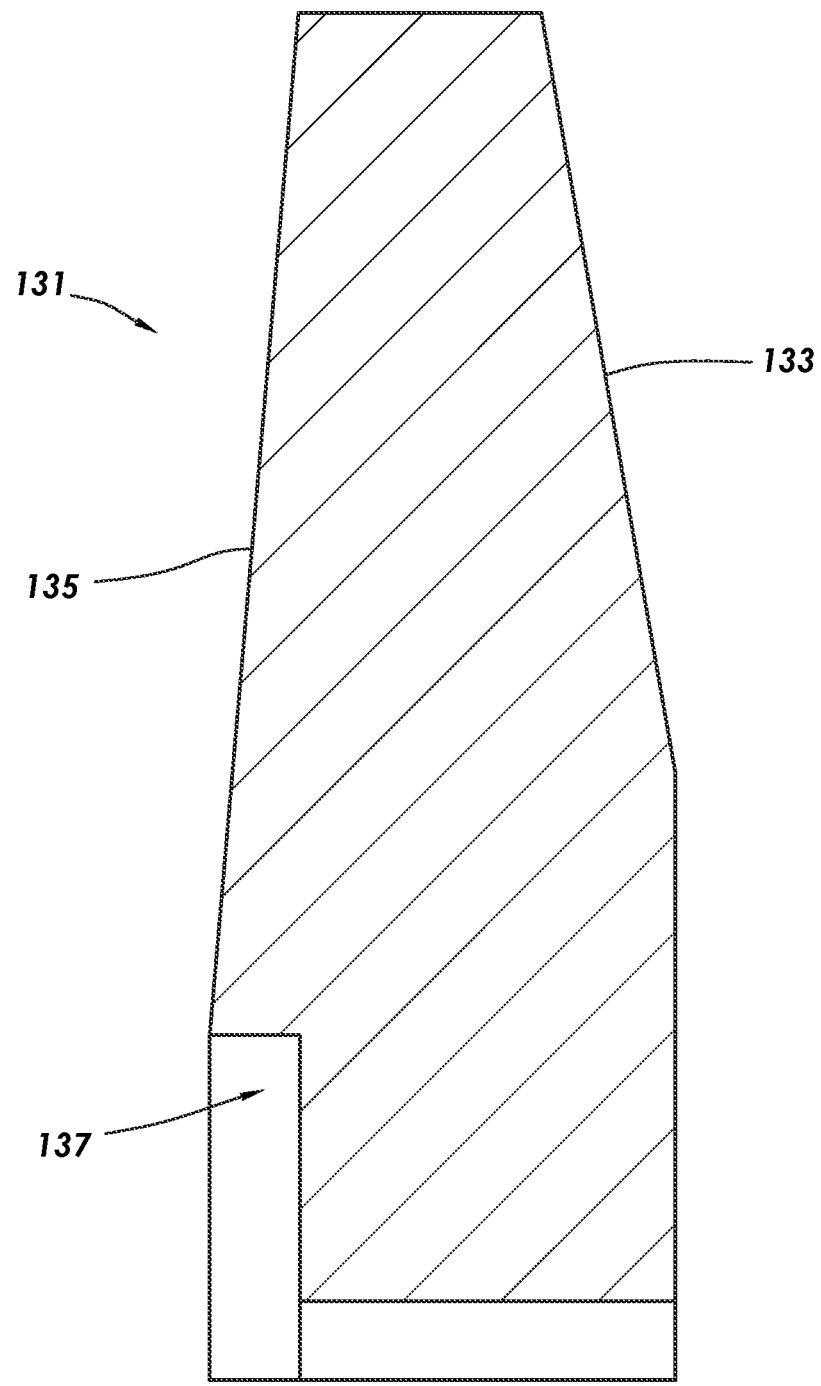
FIG. 6B depicts a partial cross section view of the pressure head of FIG. 5.

In some embodiments, as shown in FIG. 6B, reverse face 135 of pressure head 131 may be tapered. Without being bound to theory, by tapering reverse face 135, the stiffness of pressure head 131 under bending load may be increased.

With respect to FIG. 5, forcing face 133 of pressure head 131 may engage primary tapered ring 141. Primary tapered ring 141 may be annular and may be positioned about plug body 101. In some embodiments, forcing face 133 of pressure head 131 may be tapered such that a longitudinal force applied between primary tapered ring 141 and forcing face 133 biases primary tapered ring 141 radially outward away from plug body 101. Primary tapered ring 141 may include expansion face 143, defined as the face of primary tapered ring 141 in engagement with pressure head 131. In certain embodiments, expansion face 143 may be tapered at an angle that corresponds with the angle of forcing face 133 of pressure head 131. For the purposes of this disclosure, two taper angles are considered to correspond if the two taper angles are, for example and without limitation, within 15°. By selecting the taper angle, the amount of radial movement of primary tapered ring 141 for a given longitudinal displacement of primary tapered ring 141 against pressure head 131 may be determined. For example, the taper angle may be, for example and without limitation, between 1° and 45°, between 2° and 30°, or between 4° and 25°. In some embodiments, by tapering both forcing face 133 and expansion face 143 at the same angle, primary tapered ring 141 may extend in a substantially radial direction without angular deflection of primary tapered ring 141.

In certain embodiments, primary tapered ring 141 may include seal pocket 145. Seal pocket 145 may be a channel or groove in the face of primary tapered ring 141 opposite expansion face 143 and may be defined by seal roof 147 and seal lip 149. Seal roof 147 and seal lip 149 may be configured such that seal pocket 145 corresponds with the profile of primary seal ring 161 as shown in FIG. 5. In some embodiments, for example and without limitation, seal roof 147 may be configured to reduce extrusion of primary seal ring 161 as primary seal ring 161 is driven into engagement with a surrounding pipeline as further described below. In some embodiments, seal lip 149 may be configured such that radial expansion of primary tapered ring 141 may bias primary seal ring 161 into corresponding radial expansion and may reduce extrusion of primary seal ring 161 in a radially inward direction.

Figure 7G:
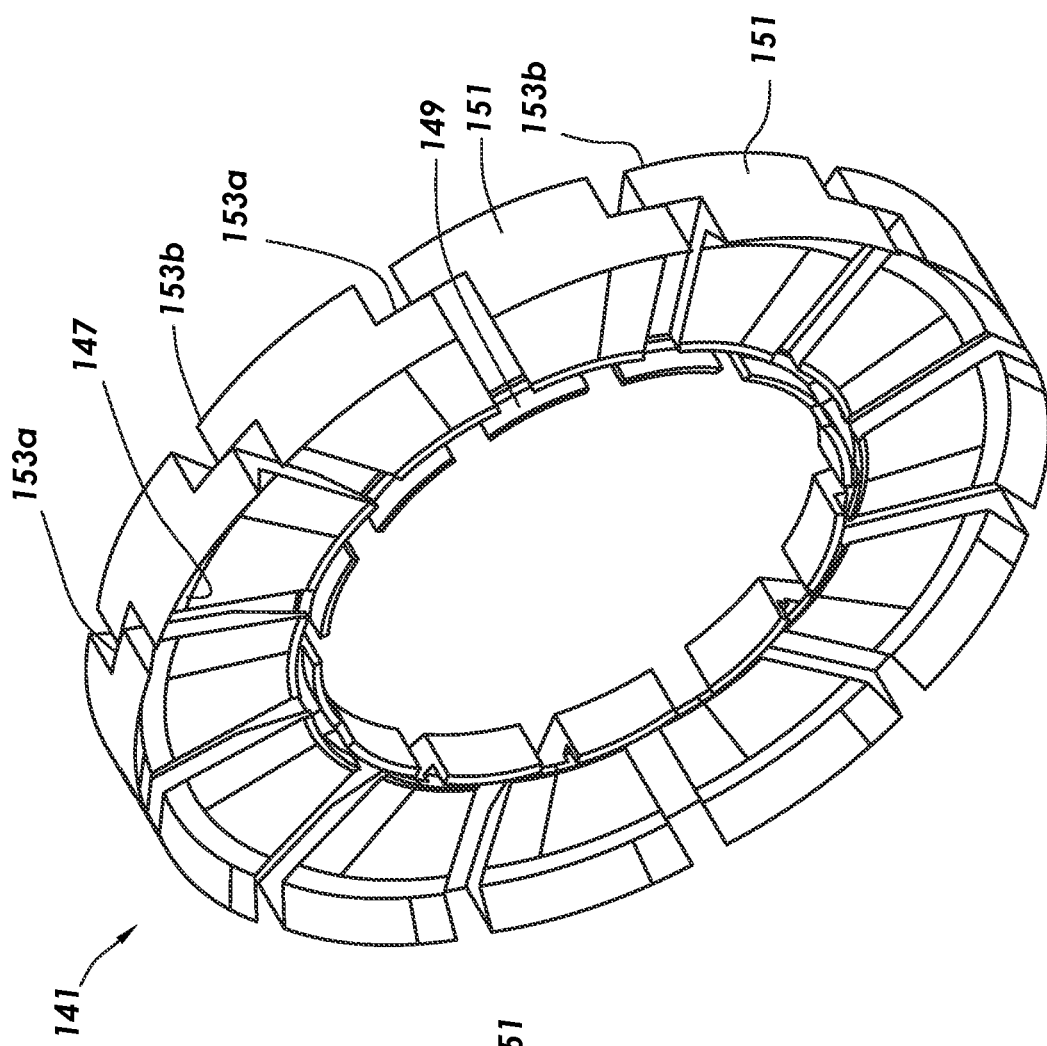
FIG. 7G depicts a perspective view of the primary tapered ring of FIG. 7 in an extended configuration.
Figure 7:
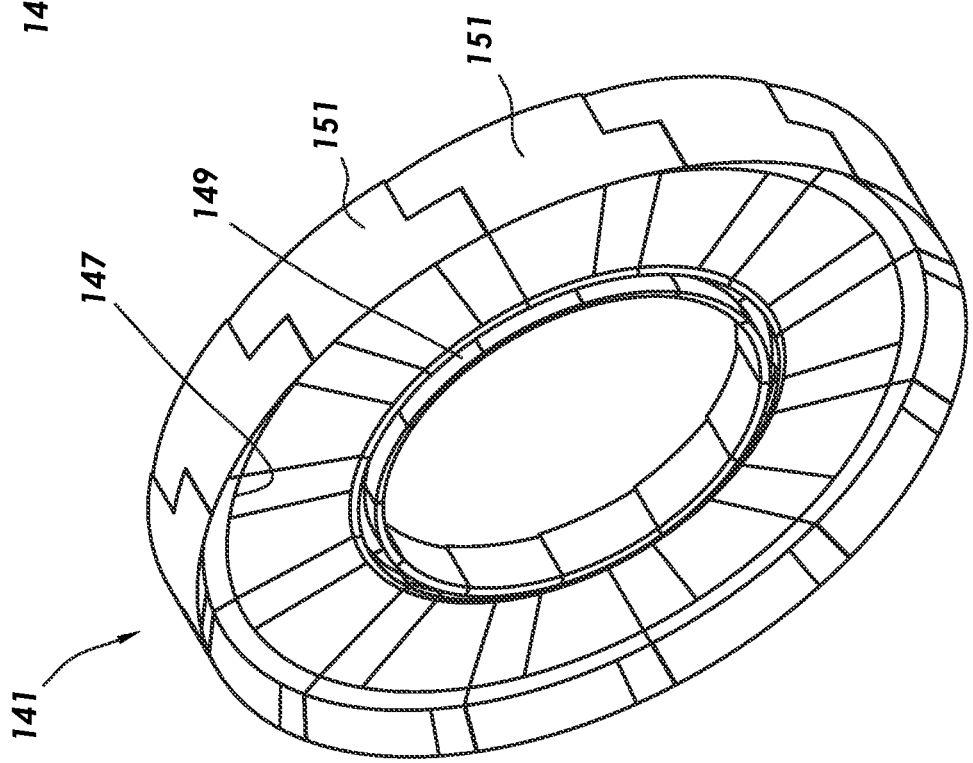
FIG. 7 depicts a perspective view of a primary tapered ring consistent with at least one embodiment of the present disclosure.
Figure 7A:
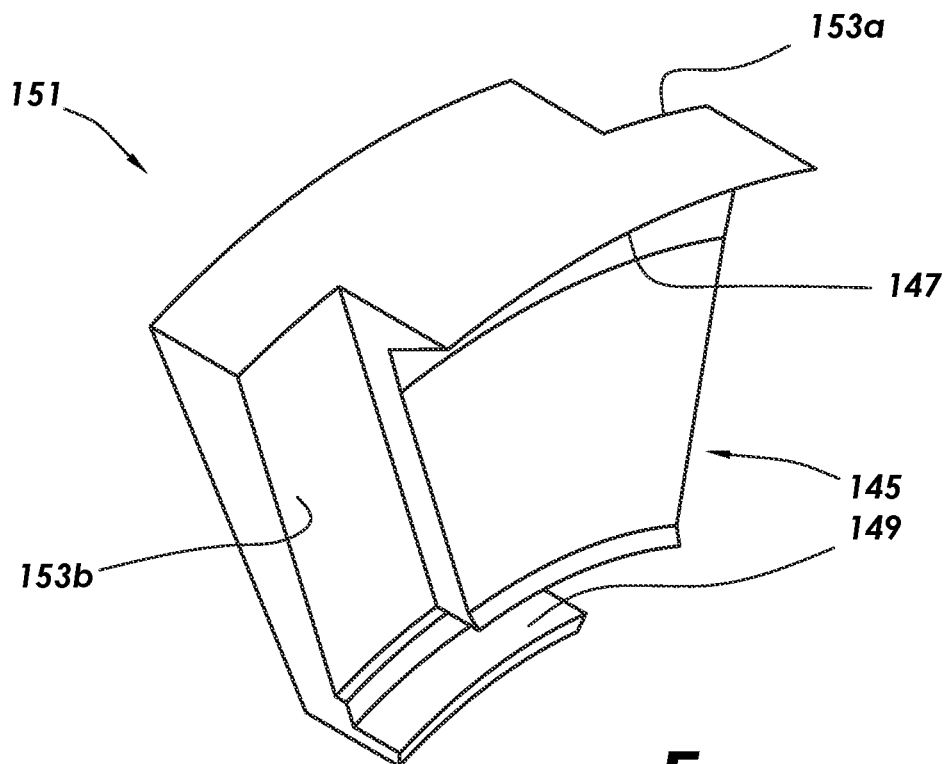
FIGS. 7A, 7B depict perspective views of a primary tapered ring segment of the primary tapered ring of FIG. 7.
Figure 7B:
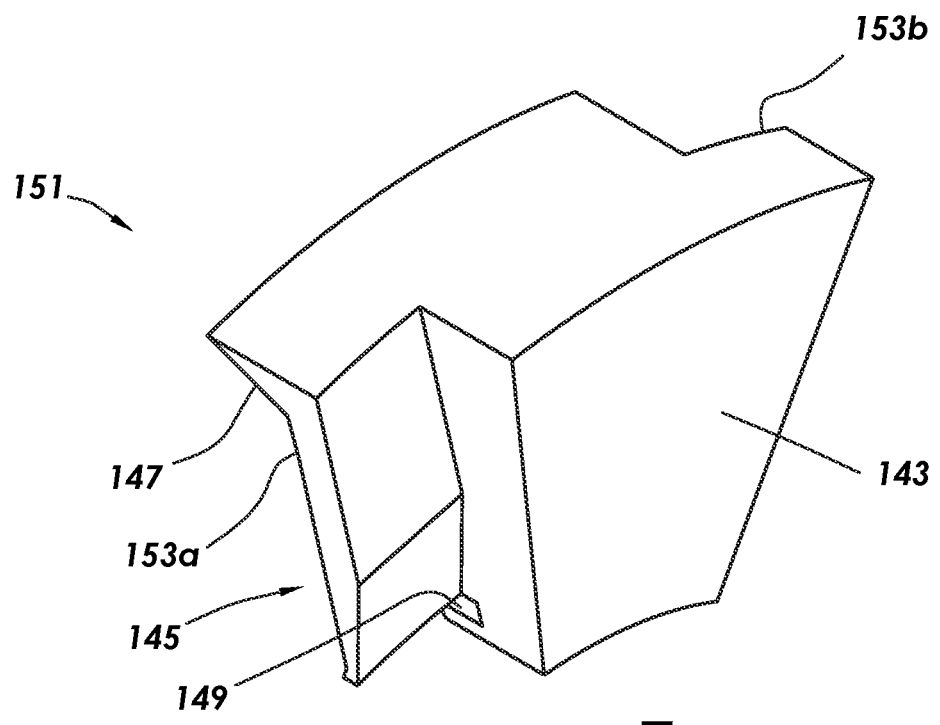

In some embodiments, as shown in FIG. 7, primary tapered ring 141 may be formed from a plurality of primary tapered ring segments 151. In such an embodiment, as shown in FIGS. 7A, 7B, 7C, 7D, each primary tapered ring segment 151 may include a portion of expansion face 143, seal roof 147, and seal lip 149. In some such embodiments, each primary tapered ring segment 151 may be slidingly interlocked to an adjacent primary tapered ring segment 151 on either circumferential side of primary tapered ring segment 151. In some such embodiments, each primary tapered ring segment may include primary tapered ring rabbets 153a, 153b. In some embodiments, primary tapered ring rabbets 153a, 153b may be configured such that primary tapered ring rabbets 153a, 153b of adjacent primary tapered ring segments 151 allow relative sliding motion between the adjacent primary tapered ring segments 151 as primary tapered ring 141 moves from a retracted configuration to an extended configuration due to longitudinal force exerted between primary tapered ring 141 and pressure head 131 as discussed above.

Figure 7E:
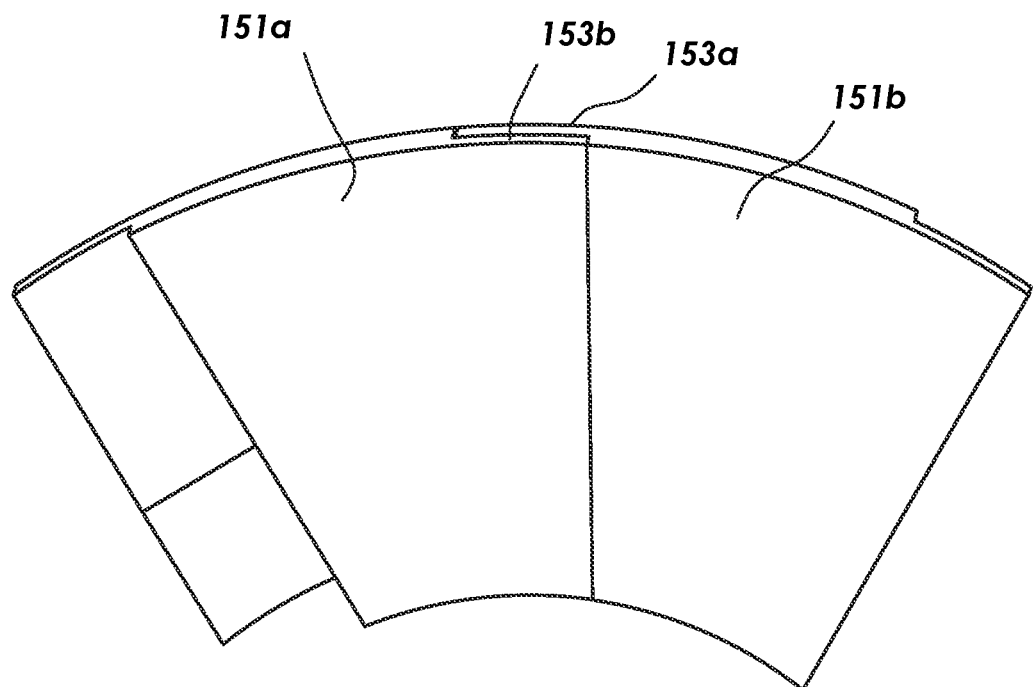
FIGS. 7E, 7F depict perspective views of two interlocked primary tapered ring segments in a retracted configuration and extended configuration, respectively.
Figure 7F:
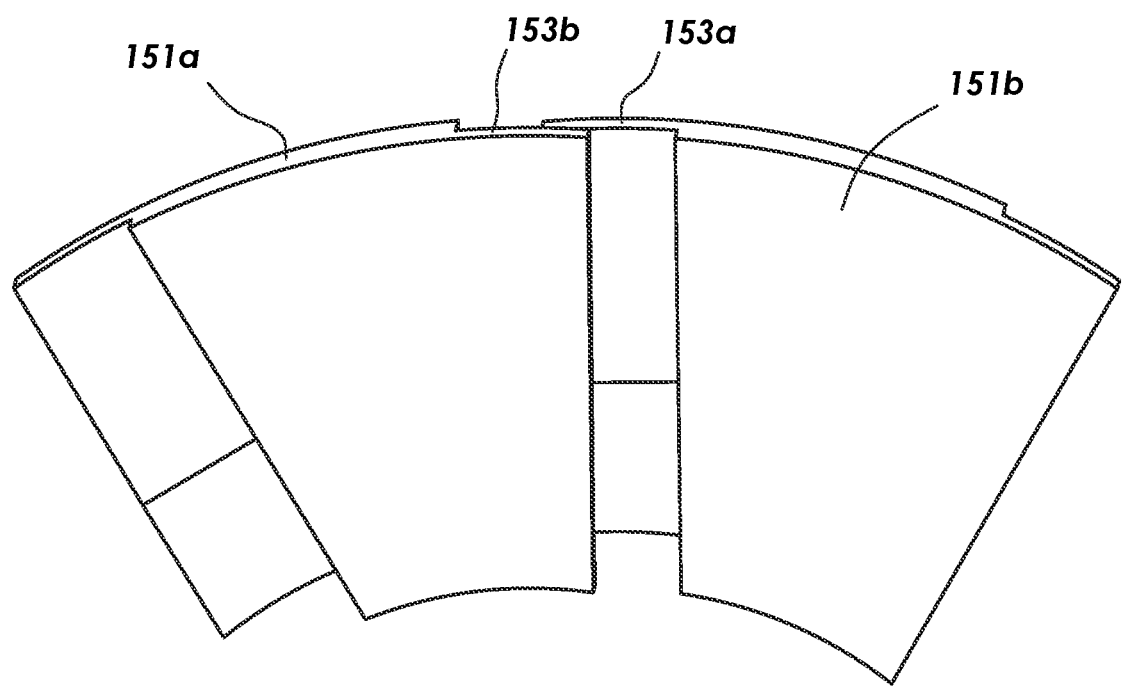

As an example, FIG. 7E depicts primary tapered ring segments 151a and 151b positioned such that primary tapered ring segments 151a and 151b are directly adjacent with primary tapered ring rabbets 153a, 153b fully interlocked. Such a configuration may occur for primary tapered ring segments 151 when primary tapered ring 141 is in the retracted configuration. FIG. 7F depicts primary tapered ring segments 151a and 151b positioned such that primary tapered ring segments 151a and 151b have slid circumferentially apart along primary tapered ring rabbets 153a, 153b. The separation along primary tapered ring rabbets 153a, 153b may increase as the radial expansion of primary tapered ring 141 increases. In some embodiments, primary tapered ring rabbets 153a, 153b may be formed such that the direction in which adjacent primary tapered ring segments 151a, 151b separate is linear.

In certain embodiments in which primary tapered ring 141 is formed from a plurality of primary tapered ring segments 151, each primary tapered ring segment 151 may include a portion of expansion face 143 of primary tapered ring 141. In some such embodiments, expansion face 143 of primary tapered ring 141 may be formed from a plurality of planar facets, each planar facet formed on a corresponding primary tapered ring segment 151. In such an embodiment, forcing face 133 of pressure head 131 may be formed from a plurality of planar facets 133a as shown in FIG. 6A wherein each planar facet 133a of forcing face 133 corresponds with a planar facet of expansion face 143. In such an embodiment, for example and without limitation, manufacturing complexity for primary tapered ring segments 151 may be simplified as compared to an embodiment in which expansion face 143 and forcing face 133 are frustoconical.

Figure 7H:
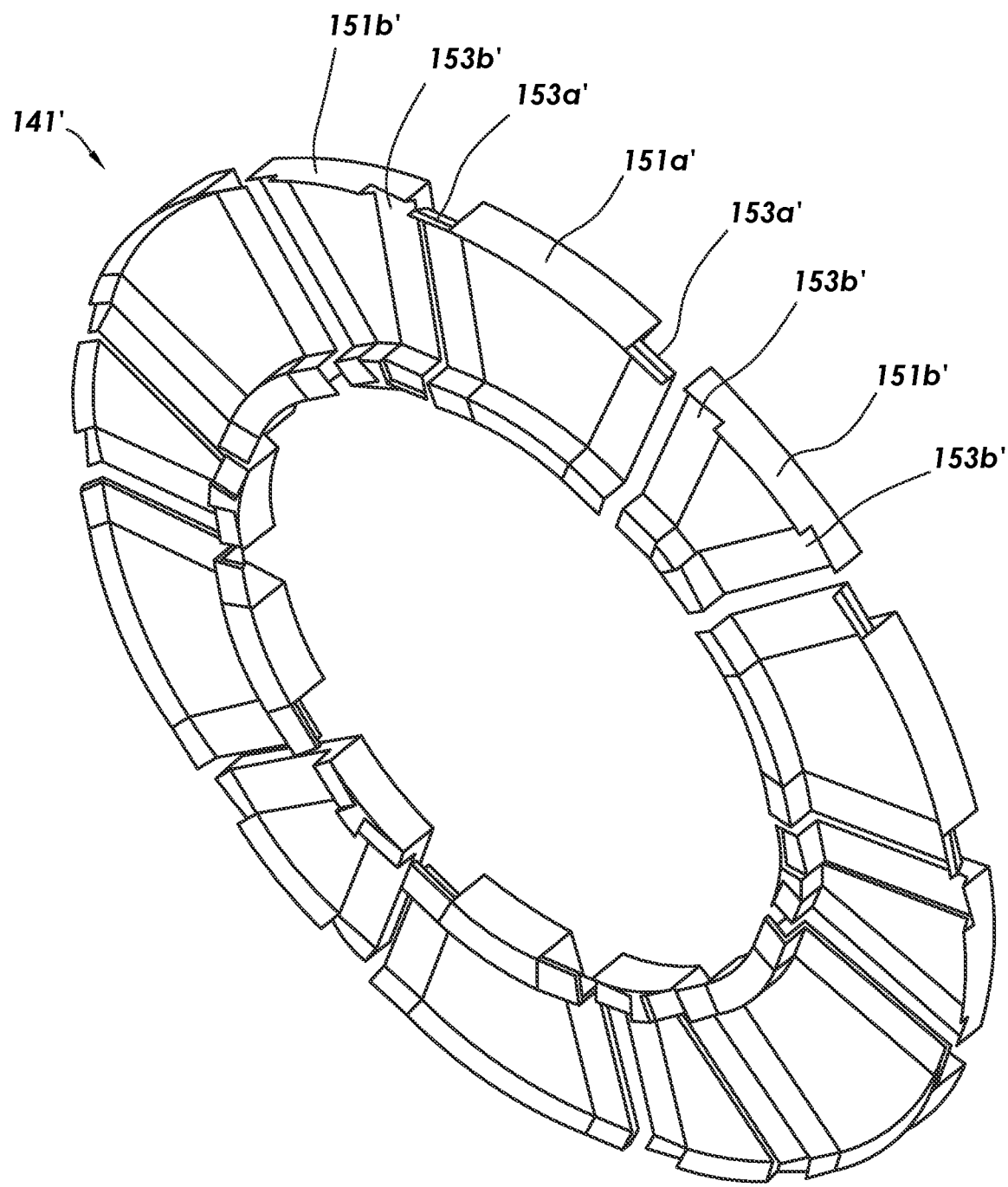
FIG. 7H depicts an exploded perspective view of a primary tapered ring consistent with at least one embodiment of the present disclosure.

In some embodiments, as depicted for example in FIGS. 7A-7G, primary tapered ring segments 151 may include primary tapered ring rabbets 153a, 153b such that each primary tapered ring segment 151 is identical. In other embodiments, such as shown in FIG. 7H, primary tapered ring 141' may include primary tapered ring segments 151a' an 151b' configured such that primary tapered ring segments 151a' include primary tapered ring rabbets 153a' on each side and each adjacent primary tapered ring segment 151b' includes primary tapered ring rabbets 153b'.

Figure 8:
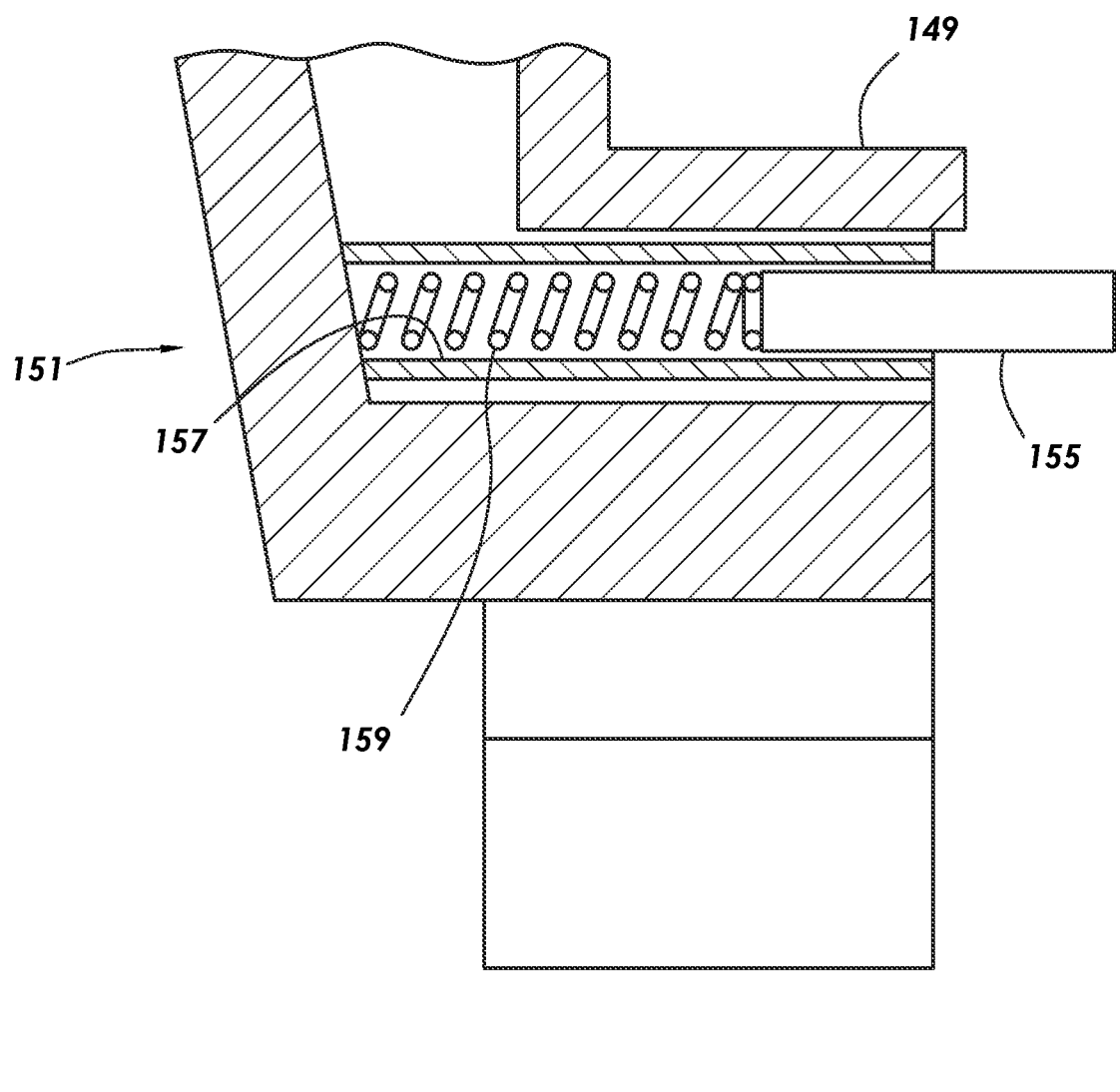
FIG. 8 depicts a partial end view of a primary tapered ring segment consistent with at least one embodiment of the present disclosure.

In some embodiments, as shown in FIG. 8, each primary tapered ring segment 151 may include extrusion guard 155. Extrusion guard 155 may, in some embodiments, be coupled to primary tapered ring segment 151 at a position radially inward from seal lip 149. Extrusion guard 155 may extend from primary tapered ring segment 151 to squeezer assembly 181 and may, for example and without limitation, reduce or prevent extrusion of primary seal ring 161 radially inwardly between primary tapered ring 141 and squeezer assembly 181. In some embodiments, extrusion guard 155 may be at least partially positioned within guard slot 157 formed in primary tapered ring segment 151 and may be biased into an extended position by guard spring 159 such that extrusion guard 155 remains in contact with squeezer assembly 181 throughout the range of radial motion of primary tapered ring 141.

Figure 9:
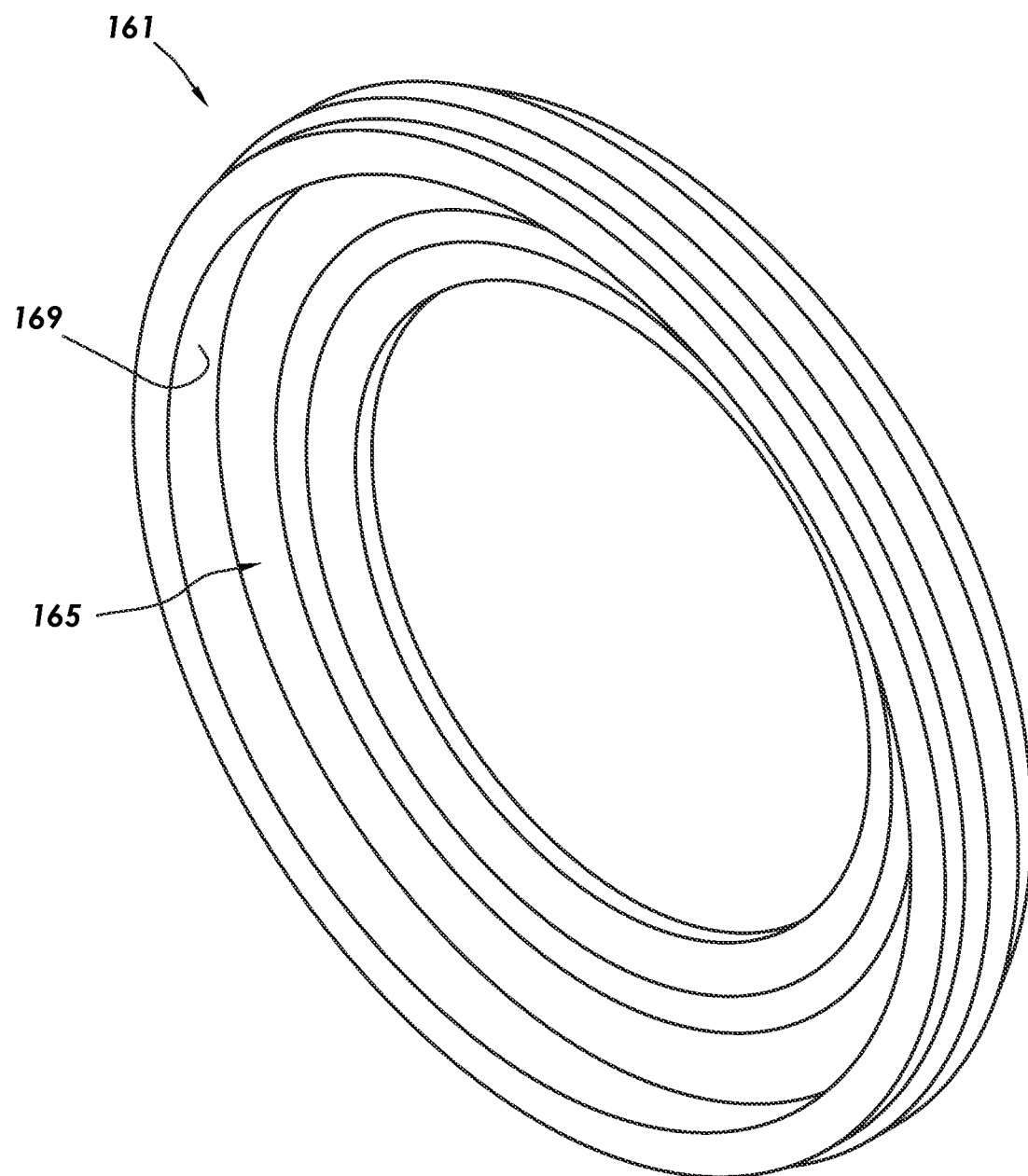
FIG. 9 depicts a perspective view of a seal ring consistent with at least one embodiment of the present disclosure.

In some embodiments, with respect to FIG. 5, primary seal ring 161 may be generally annular in shape and may be adapted to be positioned about plug body 101 in a space defined between primary tapered ring 141, squeezer assembly 181, and secondary tapered ring 201. As discussed below, primary seal ring 161 may be engaged by squeezer assembly 181 such that primary seal ring 161 engages pipeline 10. In some embodiments, with reference to FIGS. 9, 9A, primary seal ring 161 may be formed to generally correspond to the profiles of primary tapered ring 141, squeezer assembly 181, and secondary tapered ring 201. In such an embodiment, primary seal ring 161 may include primary tapered ring face 163 formed to fit into seal pocket 145 between seal roof 147 and seal lip 149 as discussed above with respect to FIG. 5. Primary seal ring 161 may further include squeezer face 165 positioned in abutment with squeezer assembly 181. In some embodiments, squeezer face 165 may be tapered at an angle similar to the taper angle of seal face 187 of squeezer assembly 181 as further described below. In some embodiments, the taper angle of squeezer face 165 and seal face 187 may be approximately equal to the taper angle of expansion face 143 and forcing face 133.

In some embodiments, primary seal ring 161 may include undercut 167 formed radially inward of squeezer face 165 and may be formed at a larger taper angle than squeezer face 165. Undercut 167 may, for example and without limitation, define an area of primary seal ring 161 that is not in abutment with seal face 187 of squeezer assembly 181. In such an embodiment, without being bound to theory, undercut 167 may reduce the likelihood that primary seal ring 161 is extruded through the gap between primary tapered ring 141 and squeezer assembly 181.

Figure 9A:
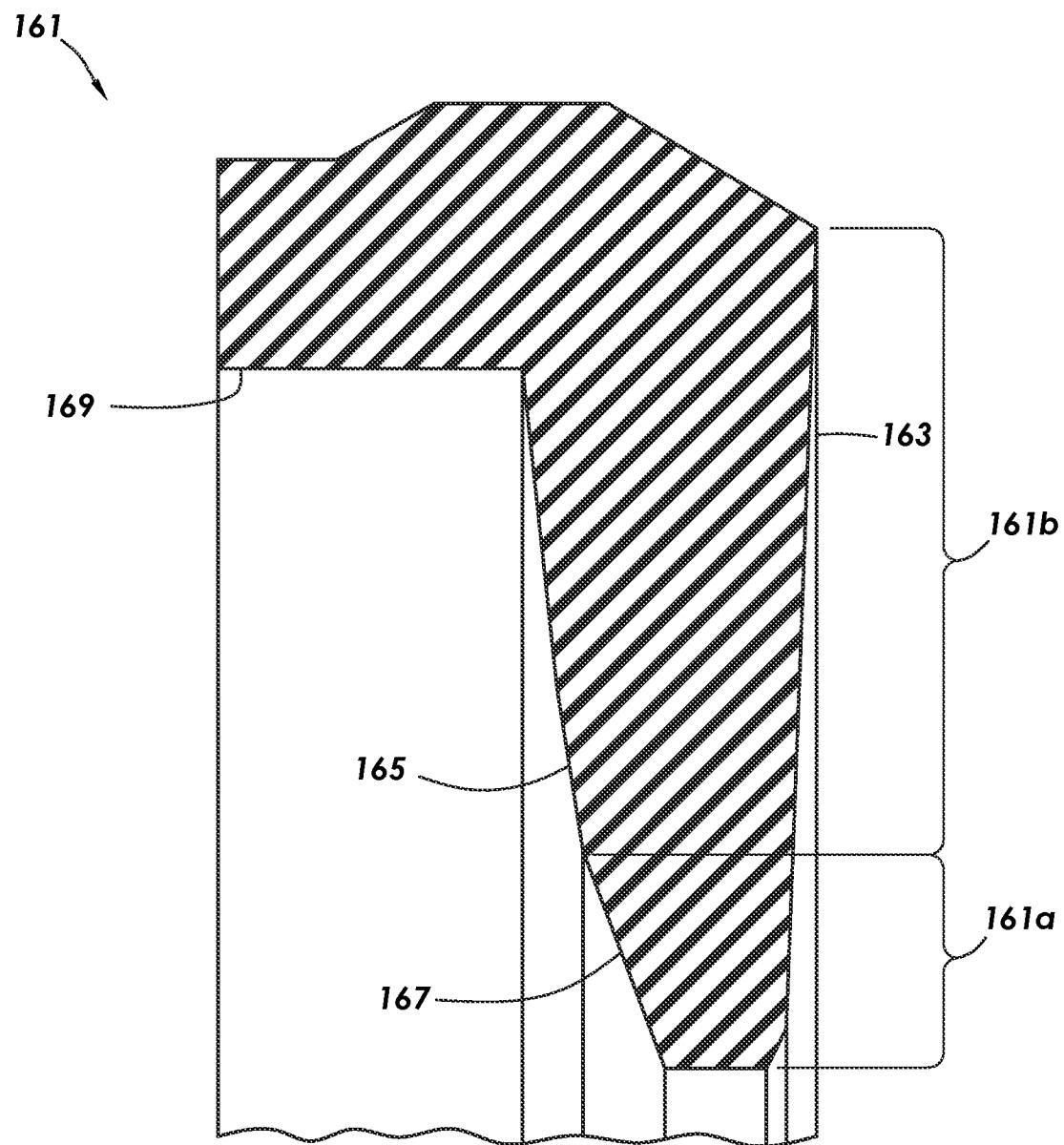
FIG. 9A depicts a partial cross section view of the seal ring of FIG. 9.

Primary seal ring 161 may be formed from an elastomeric material. In some embodiments, at least a portion of primary seal ring 161 may be formed from an elastomeric material that is harder than another portion of primary seal ring 161. For example, as shown in FIG. 9A, in some embodiments, the radially inner portion of primary seal ring 161, designated 161a, may be formed from a harder elastomeric material than the rest of primary seal ring 161, designated 161b. In such an embodiment, the harder elastomeric material of 161a may reduce the likelihood that primary seal ring 161 is extruded through the gap between primary tapered ring 141 and squeezer assembly 181 while allowing the rest of primary seal ring 161 to be formed from a softer elastomeric material 161b that more readily deforms during the actuation operation of seal assembly 121 as further described herein below.

Figure 10:
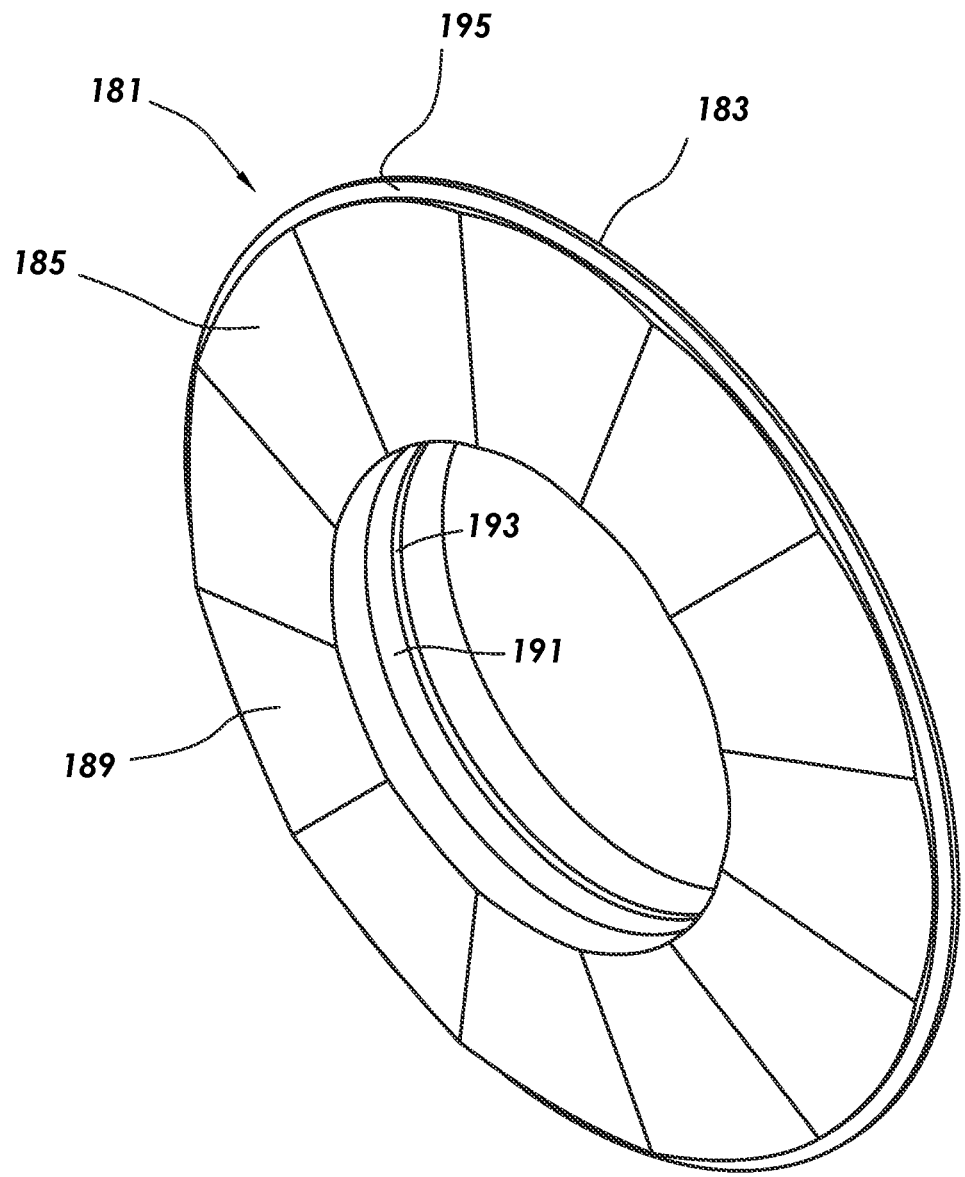
FIG. 10 depicts a perspective view of a squeezer assembly consistent with at least one embodiment of the present disclosure.
Figure 10A:
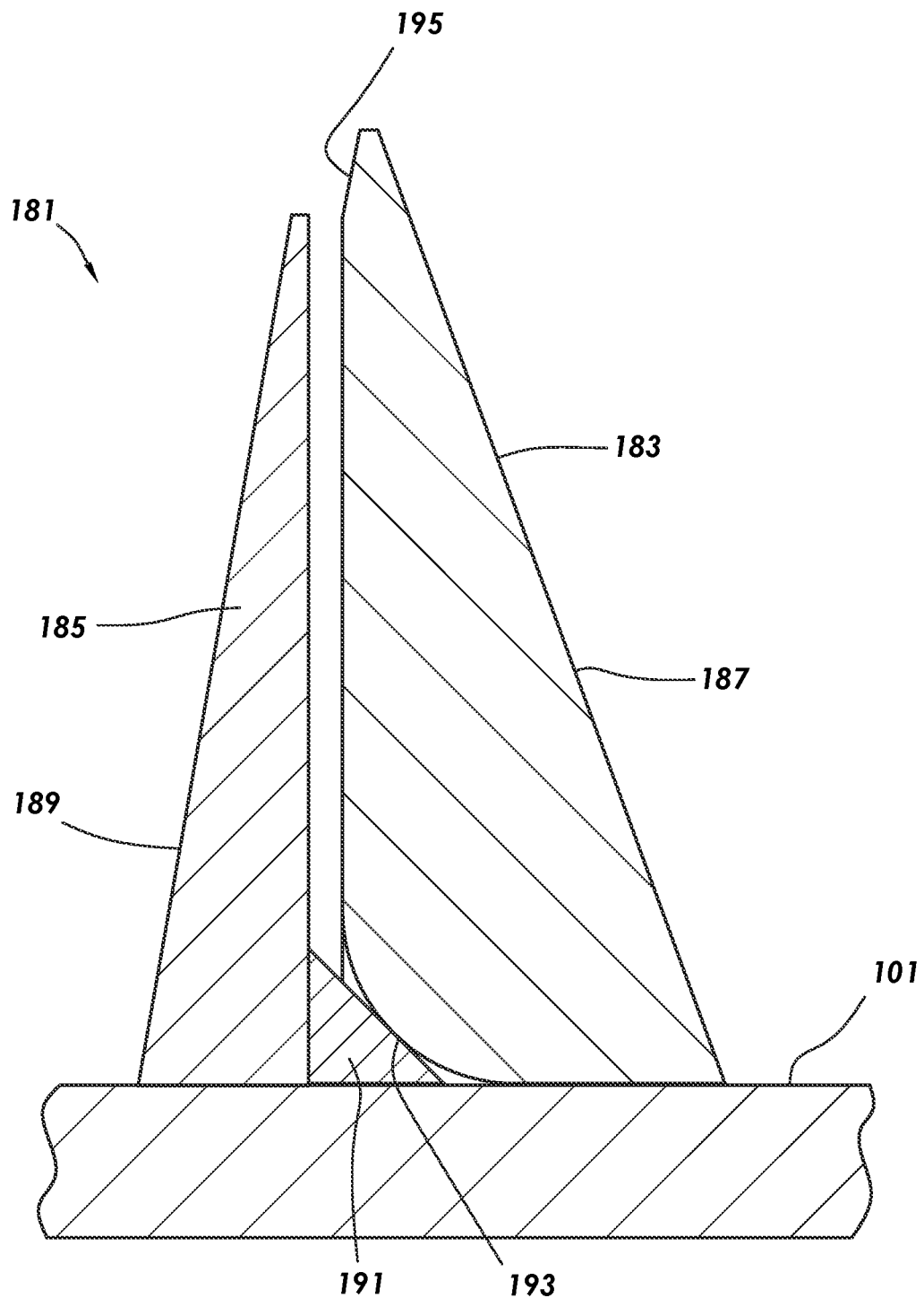
FIG. 10A depicts a cross section view of the squeezer assembly of FIG. 10.

In some embodiments, with respect to FIG. 10, squeezer assembly 181 may include large squeezer ring 183 and small squeezer ring 185 positioned about plug body 101. In some embodiments, large squeezer ring 183 and small squeezer ring 185 are each wedge-shaped in cross-section as shown in FIG. 10A. In some embodiments, large squeezer ring 183 includes seal face 187. Seal face 187, as discussed above, may be formed to have a taper corresponding to the taper of squeezer face 165 of primary seal ring 161.

In some embodiments, small squeezer ring 185 may include wedge face 189. Wedge face 189 may be formed to abut wedge squeezer face 203 of secondary tapered ring 201. In some embodiments, wedge face 189 may be formed with a taper at an angle corresponding to a taper formed in wedge squeezer face 203 of secondary tapered ring 201 such that longitudinal movement of secondary tapered ring 201 relative to squeezer assembly 181 biases secondary tapered ring 201 radially outward from plug body 101. In some embodiments, the taper angle of wedge face 189 and wedge squeezer face 203 may correspond with the taper angle of squeezer face 165, seal face 187, expansion face 143, and forcing face 133. In some embodiments, wedge face 189 may be oriented to face the opposite direction as seal face 187.

In certain embodiments, large squeezer ring 183 and small squeezer ring 185 may be longitudinally separated along plug body 101 by inner seal 191. Inner seal 191 may be positioned about and in abutment with plug body 101. In some embodiments, inner seal 191 may be positioned such that as seal assembly 121 is actuated, large squeezer ring 183 and small squeezer ring 185 are biased into contact with inner seal 191. While inner seal 191 is compressed by large squeezer ring 183, small squeezer ring 185, and plug body 101, inner seal 191 may provide a fluid seal to retard or resist fluid flow between squeezer assembly 181 and plug body 101. As the bias force is also exerted between large squeezer ring 183 and primary seal ring 161 at the interface of squeezer face 165 and seal face 187, a fluid seal is also formed between squeezer assembly 181 and primary seal ring 161 to retard or resist fluid flow between squeezer assembly 181 and primary seal ring 161.

In some embodiments, inner seal 191 may be triangular in cross section. In some embodiments, large squeezer ring 183 may include inner seal face 193 positioned to engage inner seal 191. In some embodiments, inner seal face 193 may be radiused or otherwise curved to, for example and without being bound to theory, increase the contact area between large squeezer ring 183 and inner seal 191. In some embodiments, inner seal 191 may be formed as part of primary seal ring 161. In such an embodiment, inner seal 191 may be connected to primary seal ring 161 by a continuous flange or one or more continuous or discontinuous features. In some embodiments, a portion of primary seal ring 161 may extend at least partially between large squeezer ring 183 and small squeezer ring 185.

In some embodiments, with reference to FIG. 5, primary seal ring 161 may include return flange 169. Return flange 169 may engage with return pocket 205 of secondary tapered ring 201 and may, for example and without limitation, assist with retraction of secondary tapered ring 201 when seal assembly 121 is retracted as further described herein below.

In some embodiments, secondary tapered ring 201 may be generally annular and may be positioned about plug body 101. In some embodiments, secondary tapered ring 201 may include wedge squeezer face 203 that, as discussed above, is tapered and abuts wedge face 189 of squeezer assembly 181. In some embodiments, return pocket 205 may be positioned radially outward from wedge face 189 on secondary tapered ring 201. In some embodiments, return flange 169 of primary seal ring 161 may be generally rectangular in cross section. In some embodiments, return pocket 205 may be configured such that return flange 169 does not fully enter return pocket 205 when seal assembly 121 is in the run-in position to, for example and without limitation, account for the relative longitudinal movement between primary seal ring 161 and secondary tapered ring 201 during actuation of seal assembly 121.

In some embodiments, secondary tapered ring 201 may include wedge extension face 207. Wedge extension face 207 may be positioned opposite wedge squeezer face 203 such that wedge extension face 207 engages bowl 231. In some embodiments, wedge extension face 207 is formed with a taper angle that corresponds with or is similar to wedge face 233 of bowl 231 such that longitudinal movement of bowl 231 relative to secondary tapered ring 201 biases secondary tapered ring 201 radially outward from plug body 101. In some embodiments, the taper angle of wedge face 233 of bowl 231 and wedge extension face 207 may correspond with the taper angle of wedge face 189, wedge squeezer face 203, squeezer face 165, seal face 187, expansion face 143, and forcing face 133.

Figure 11:
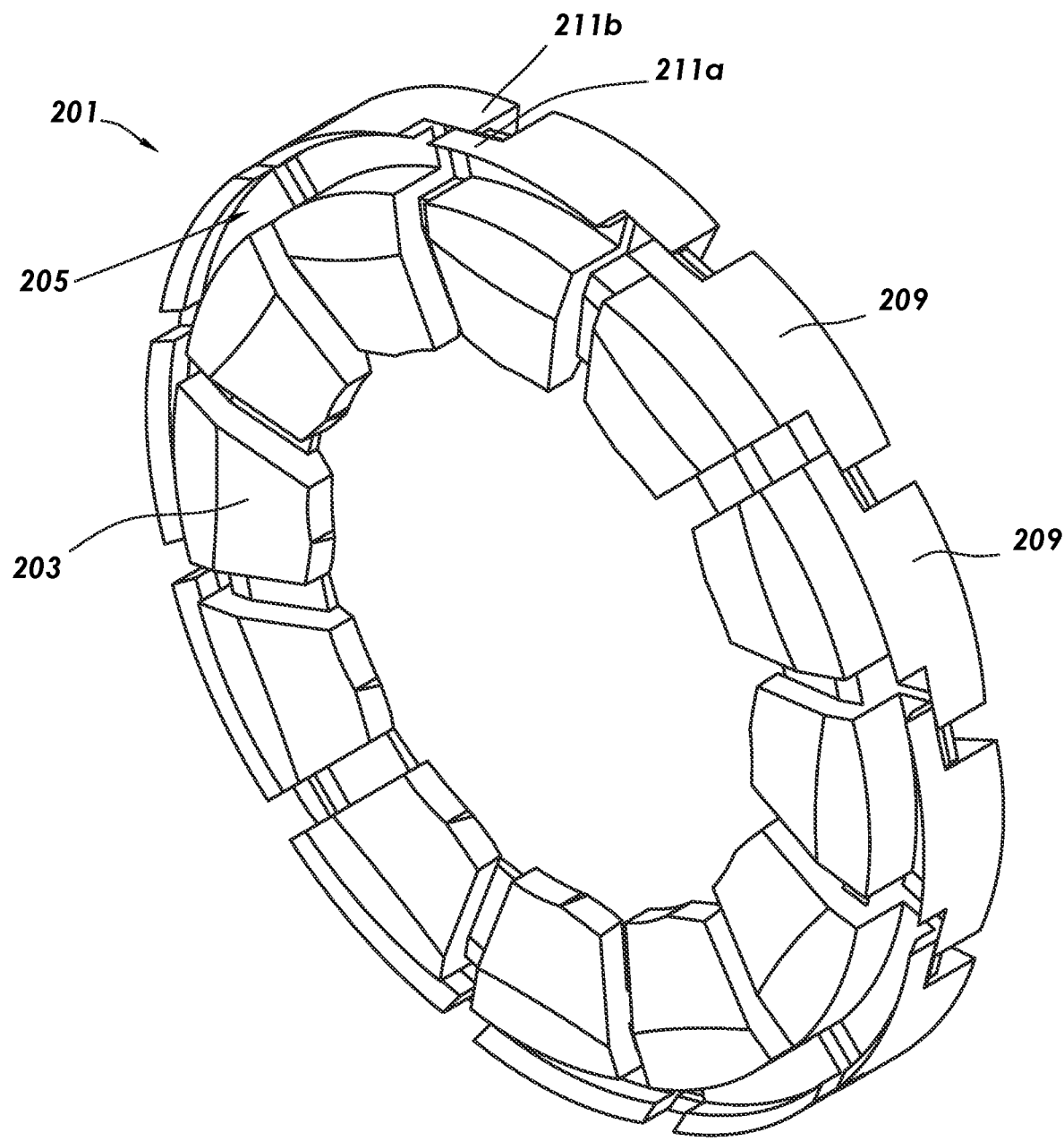
FIG. 11 depicts a perspective view of a secondary tapered ring consistent with at least one embodiment of the present disclosure.
Figure 11A:
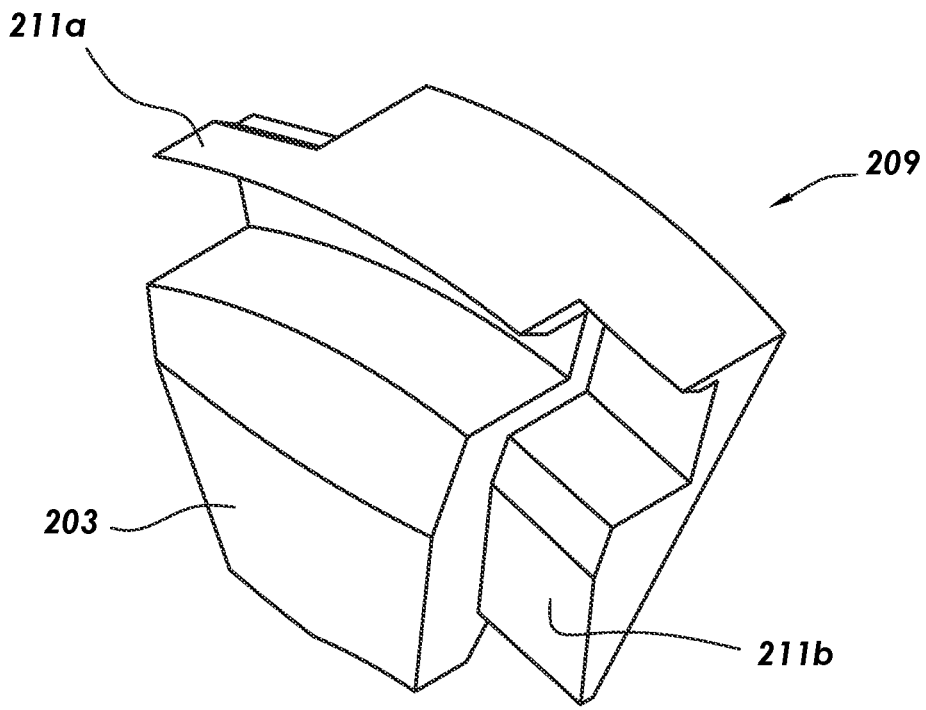
FIGS. 11A, 11B depict perspective views of wedge segments of the secondary tapered ring of FIG. 11.
Figure 11B:
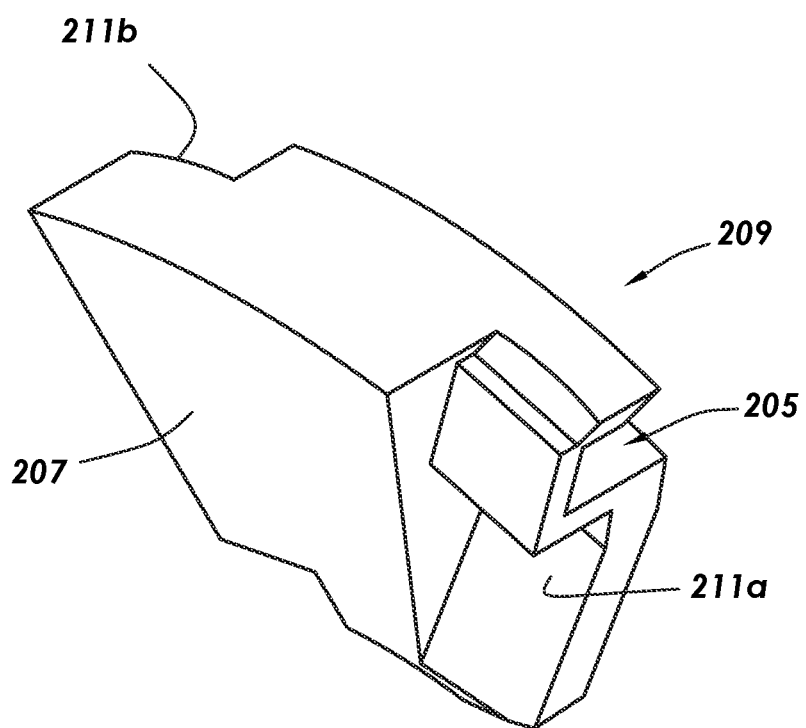
Figure 11D:
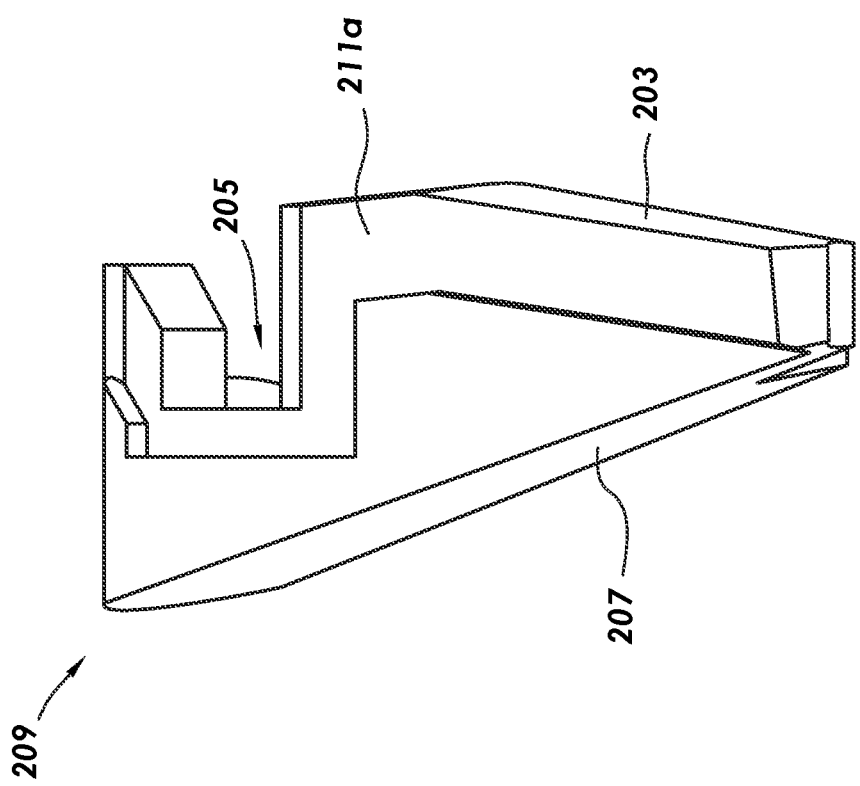
FIGS. 11C, 11D depict end views of a wedge segment of the secondary tapered ring of FIG. 11.
Figure 11C:
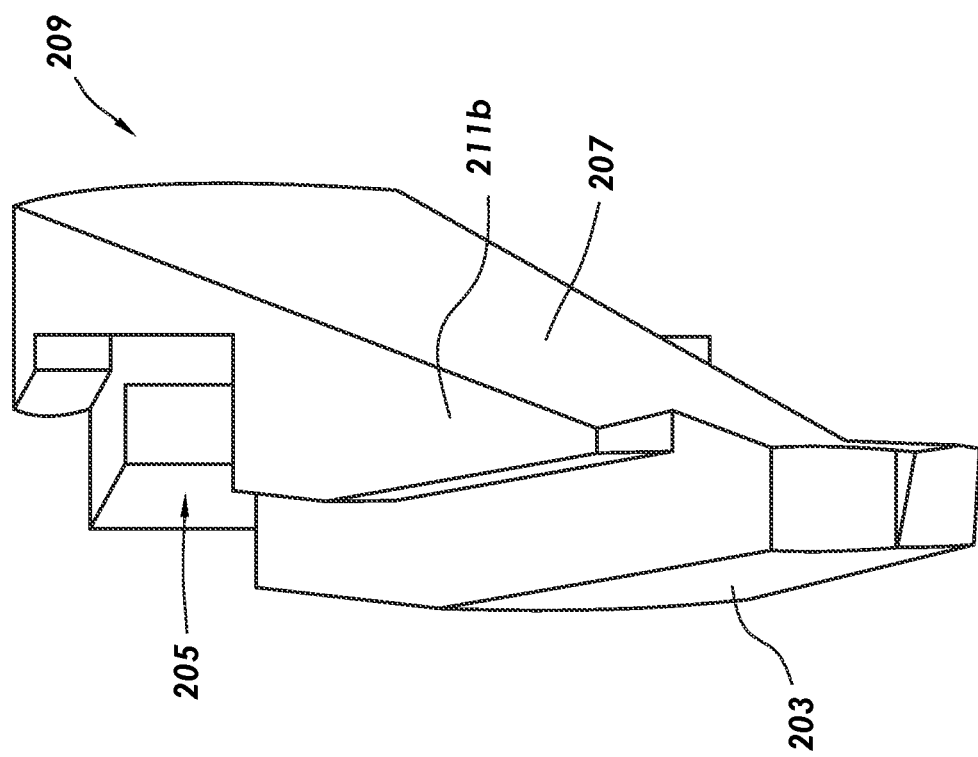

In some embodiments, as shown in FIG. 11, secondary tapered ring 201 may be formed from a plurality of wedge segments 209. In such an embodiment, as shown in FIGS. 11A, 11B, 11C, 11D, each wedge segment 209 may include a portion of wedge extension face 207 and return pocket 205. In some such embodiments, each wedge segment 209 may be slidingly interlocked to an adjacent wedge segment 209 on either circumferential side of wedge segment 209. In some such embodiments, each wedge segment 209 may include wedge rabbets 211a, 211b. In some embodiments, wedge rabbets 211a, 211b may be configured such that wedge rabbets 211a, 211b of adjacent wedge segments 209 allow relative sliding motion between the adjacent wedge segments 209 as secondary tapered ring 201 moves from a retracted configuration to an extended configuration due to longitudinal force exerted between secondary tapered ring 201 and pressure head 131 as discussed above. In some embodiments, as depicted for example in FIGS. 11A-F, wedge segments 209 may include wedge rabbets 211a, 211b such that each wedge segment 209 is identical. In other embodiments, similar to as described herein above with respect to FIG. 7H, secondary tapered ring 201 may include wedge segments 209 configured such that some wedge segments 209 include wedge rabbets 211a on each side and each wedge segment 209 includes wedge rabbets 211b.

Figure 11E:
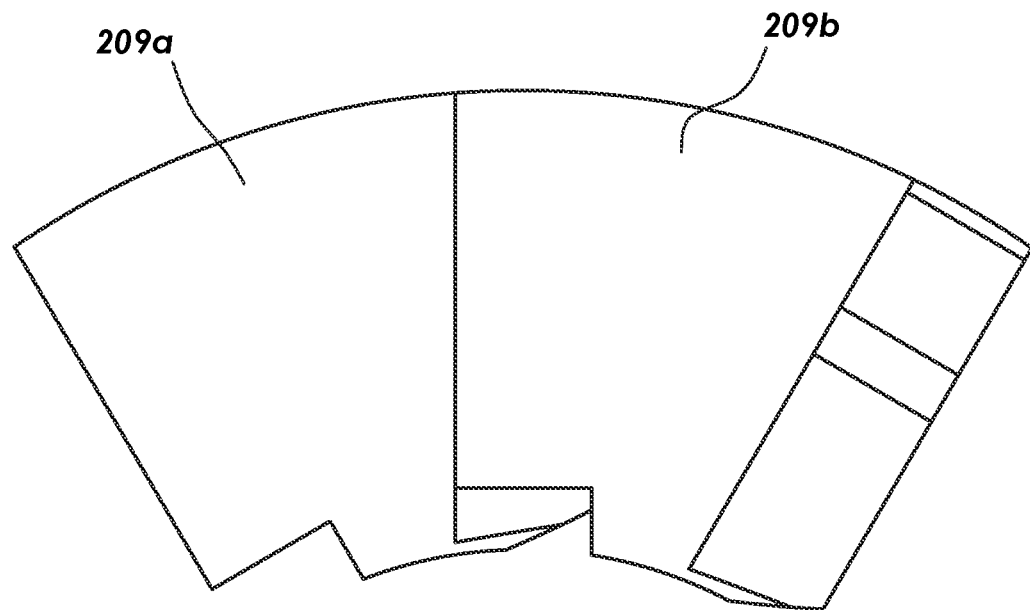
FIGS. 11E, 11F depict perspective views of two interlocked wedge segments in a retracted configuration and extended configuration, respectively.
Figure 11F:
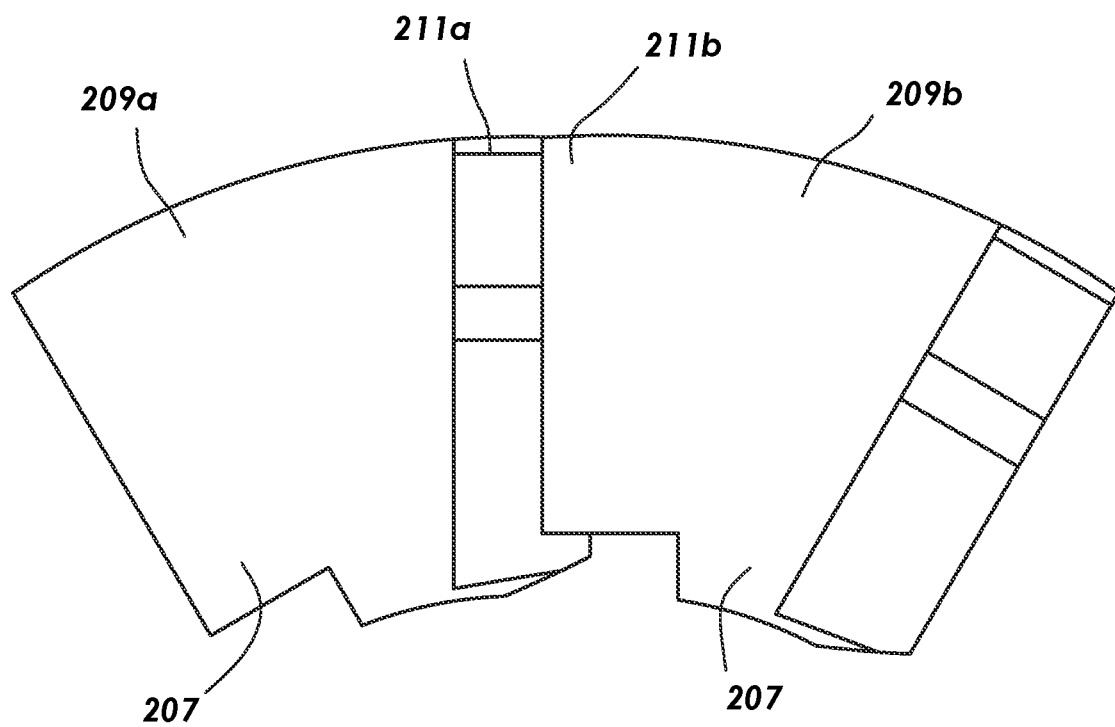

As an example, FIG. 11E depicts wedge segments 209a and 209b positioned such that wedge segments 209a and 209b are directly adjacent with wedge rabbets 211a, 211b fully interlocked. Such a configuration may occur for wedge segments 209 when secondary tapered ring 201 is in the retracted configuration. FIG. 11F depicts wedge segments 209a and 209b positioned such that wedge segments 209a and 209b have slid circumferentially apart along wedge rabbets 211a, 211b. The separation along wedge rabbets 211a, 211b may increase as the radial expansion of secondary tapered ring 201 increases. In some embodiments, wedge rabbets 211a, 211b may be formed such that the direction in which adjacent wedge segments 209a, 209b separate is linear. In some embodiments, wedge segments 209a, 209b may include wedge rabbets 211a, 211b such that each wedge segment 209a and 209b is identical. In other embodiments, similar to as discussed with respect to FIG. 7H, secondary tapered ring 201 may include wedge segments 209a and 209b configured such that wedge segments 209a include wedge rabbets 211a on each side and each adjacent wedge segments 209b includes wedge rabbets 211b.

Figure 12:
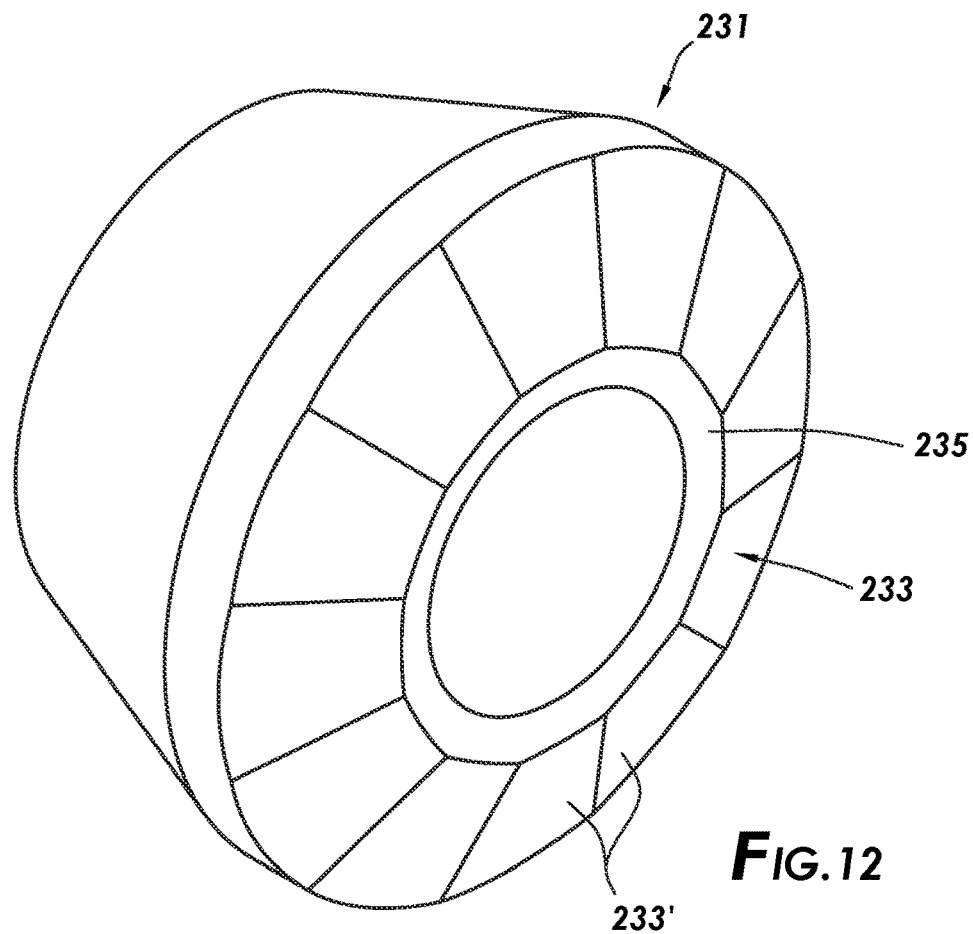
FIG. 12 depicts a perspective view of a bowl consistent with at least one embodiment of the present disclosure.

In certain embodiments in which secondary tapered ring 201 is formed from a plurality of wedge segments 209, each wedge segment 209 may include a portion of wedge extension face 207 of secondary tapered ring 201. In some such embodiments, wedge extension face 207 of secondary tapered ring 201 may be formed from a plurality of planar facets, each planar facet formed on a corresponding wedge segment 209. In such an embodiment, wedge face 233 of bowl 231 may be formed from a plurality of planar facets 233' as shown in FIG. 12 wherein each planar facet 233' of wedge face 233 corresponds with a planar facet 207' of wedge extension face 207. In such an embodiment, for example and without limitation, manufacturing complexity for wedge segments 209 may be simplified as compared to an embodiment in which wedge extension face 207 and wedge face 233 are frustoconical.

Figure 12A:
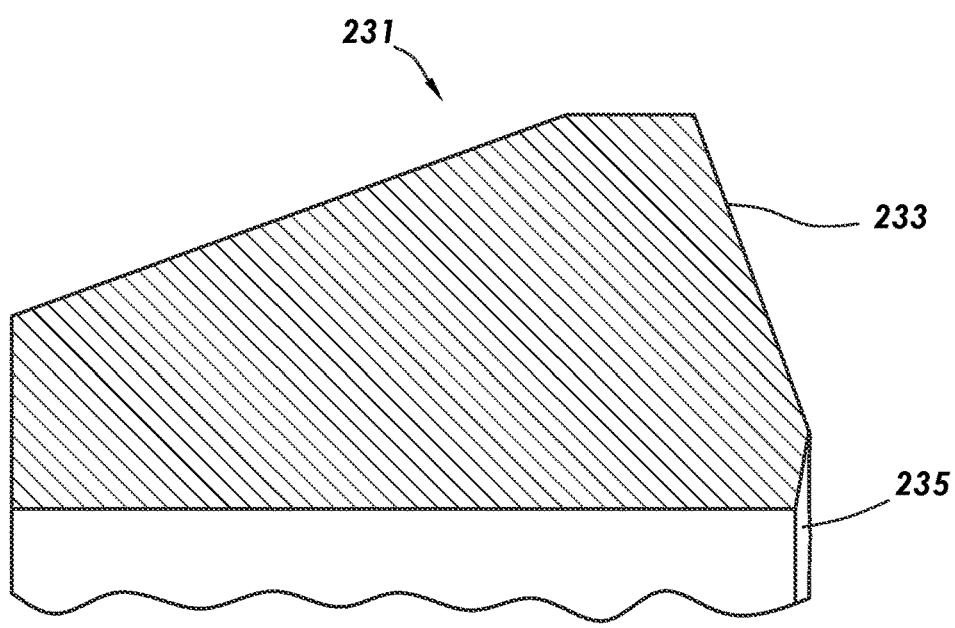
FIG. 12A depicts a partial cross section view of the bowl of FIG. 12.
Figure 18:
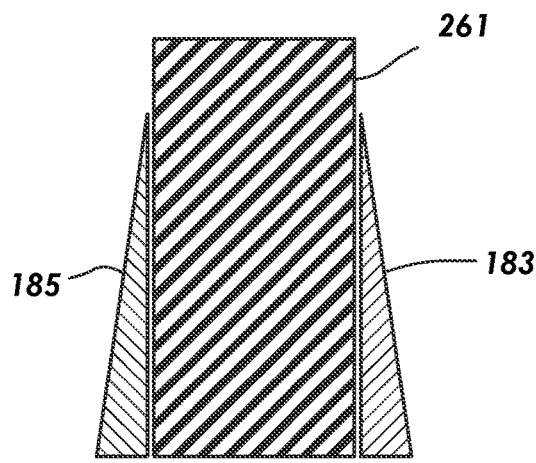
FIGS. 18-21 depict configurations of primary seals and squeezer assemblies, each consistent with at least one embodiment of the present disclosure.

In some embodiments, as shown in FIGS. 12, 12A, bowl 231 may include squeezer undercut 235. Squeezer undercut 235 may be positioned radially within wedge face 233 and may be positioned to at least partially receive small squeezer ring 185 when seal assembly 121 is fully actuated (as shown in FIG. 18).

In some embodiments, the face of bowl 231 opposite wedge face 233 may be coupled to movable head 107 of pipeline plug 100 such that bowl 231 is moved in response to movement of movable head 107 of pipeline plug 100. In some embodiments, such as shown in FIG. 1, bowl 231 may be coupled to movable head 107 via gripper assembly 111.

Figure 13:
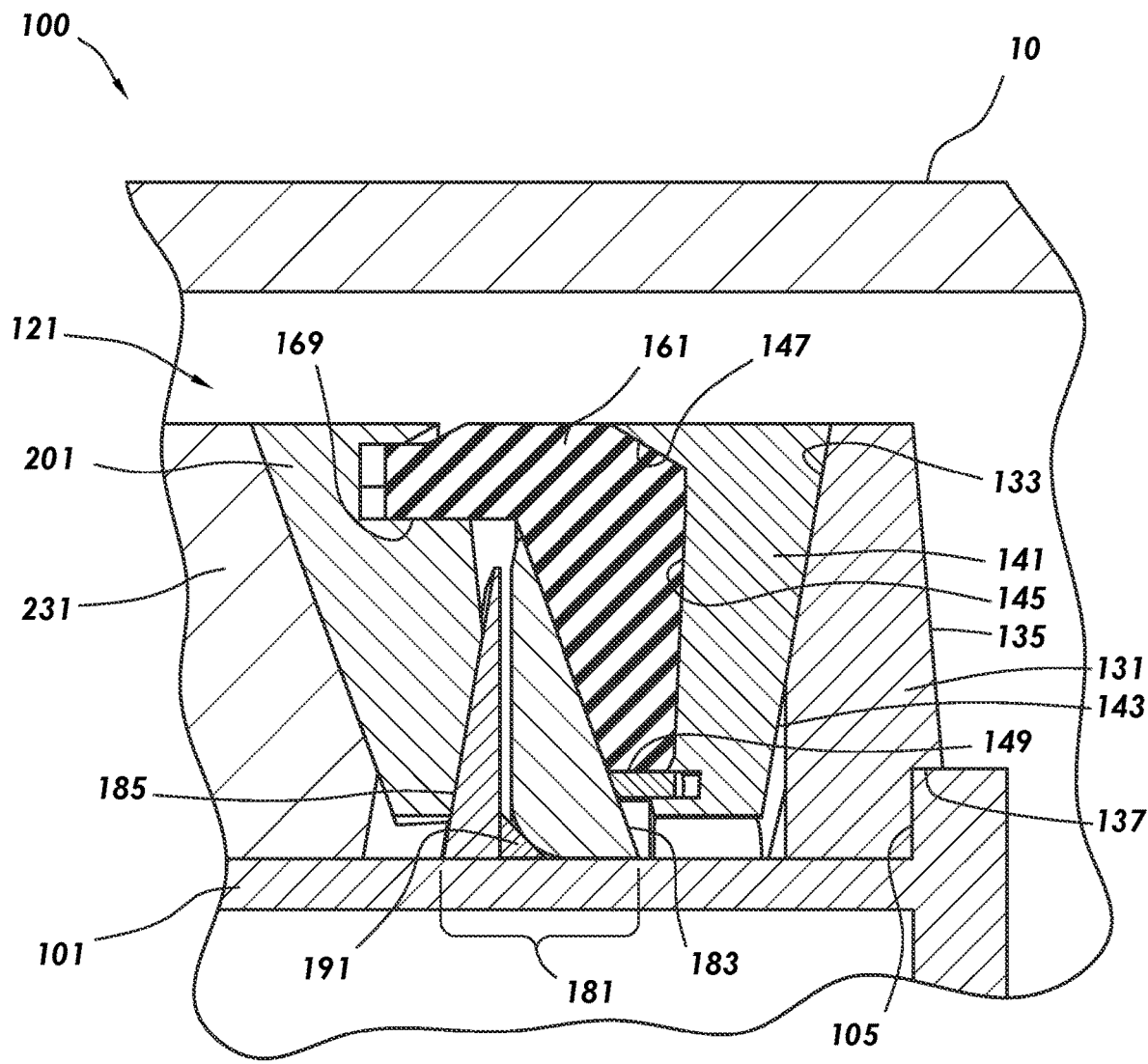
FIGS. 13-17 depict partial cross section views of an actuation operation of a seal assembly consistent with at least one embodiment of the present disclosure.

FIGS. 13-18 depict a nonlimiting example of a plugging operation involving pipeline plug 100. Pipeline plug 100 is positioned at a desired location within pipeline 10 in the run-in configuration as shown in FIG. 13. In some embodiments in which gripper assembly 111 is included to pipeline plug 100, gripper assembly 111 may be actuated to engage with pipeline 10 such that movement of pipeline plug 100 within pipeline 10 is retarded or restricted. In some such embodiments, gripper assembly 111 may be actuated using actuation mechanism 103. In other embodiments, gripper assembly 111 may be actuated by any other actuation mechanism.

Seal assembly 121 may be actuated to provide fluid isolation within pipeline 10. In some such embodiments, actuation mechanism 103 may be activated such that movable head 107 is moved longitudinally toward fixed head 105. The differential compressive force applied between pressure head 131, coupled to fixed head 105, and bowl 231, coupled to movable head 107, is applied to each abutting component of seal assembly 121, thereby generating a normal force between bowl 231 and secondary tapered ring 201, secondary tapered ring 201 and squeezer assembly 181, squeezer assembly 181 and primary seal ring 161, primary seal ring 161 and primary tapered ring 141, and primary tapered ring 141 and pressure head 131.

Figure 14:
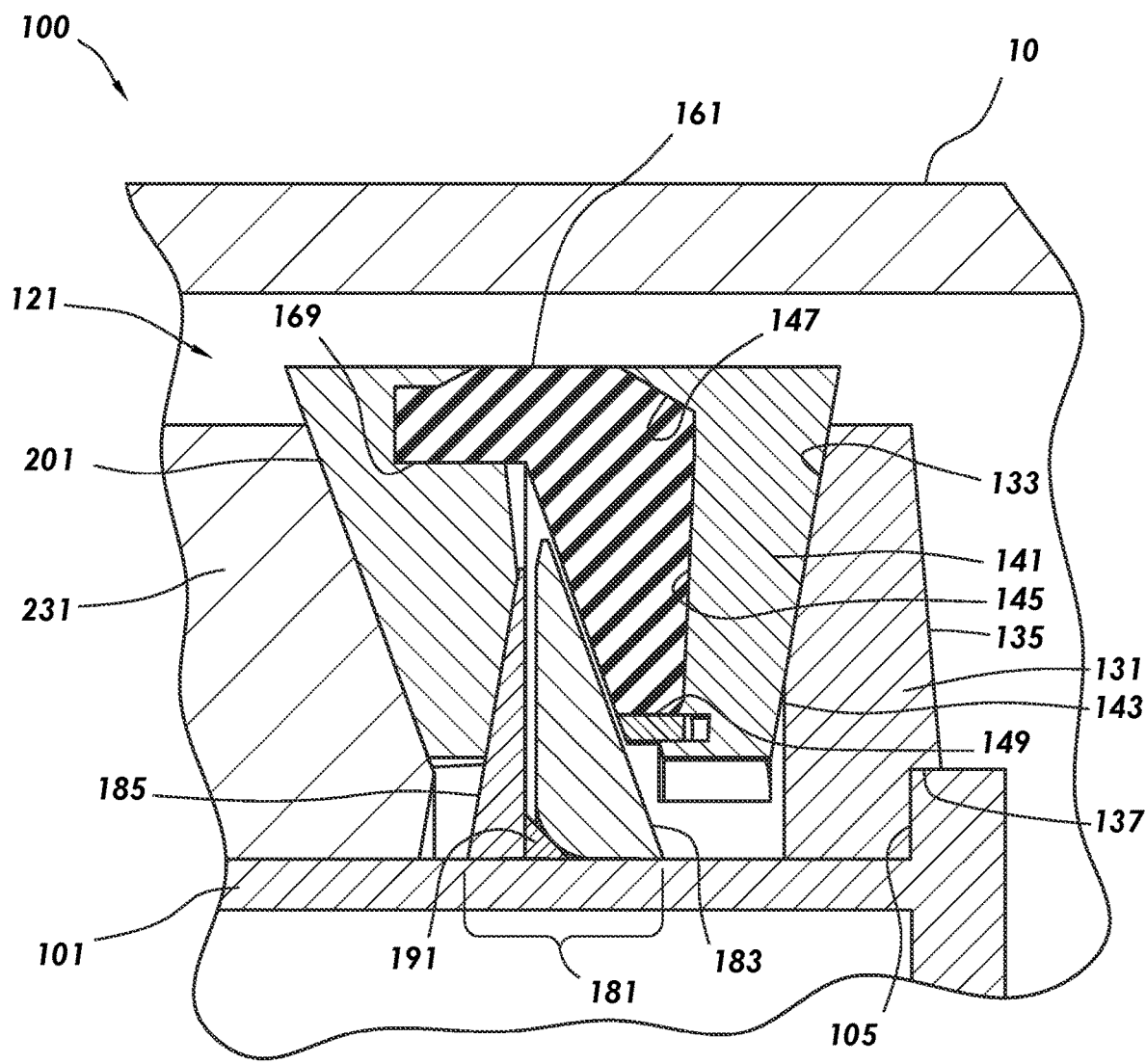

As shown in FIG. 14, because secondary tapered ring 201 engages squeezer assembly 181 at small squeezer ring 185 and primary seal ring 161 engages squeezer assembly 181 and large squeezer ring 183, the compressive longitudinal force may cause small squeezer ring 185 and large squeezer ring 183 to pinch together, further compressing against inner seal 191. In some embodiments, primary tapered ring 141 and secondary tapered ring 201 may be reversed in position relative to squeezer assembly 181 without deviating from the scope of this disclosure.

Figure 15:
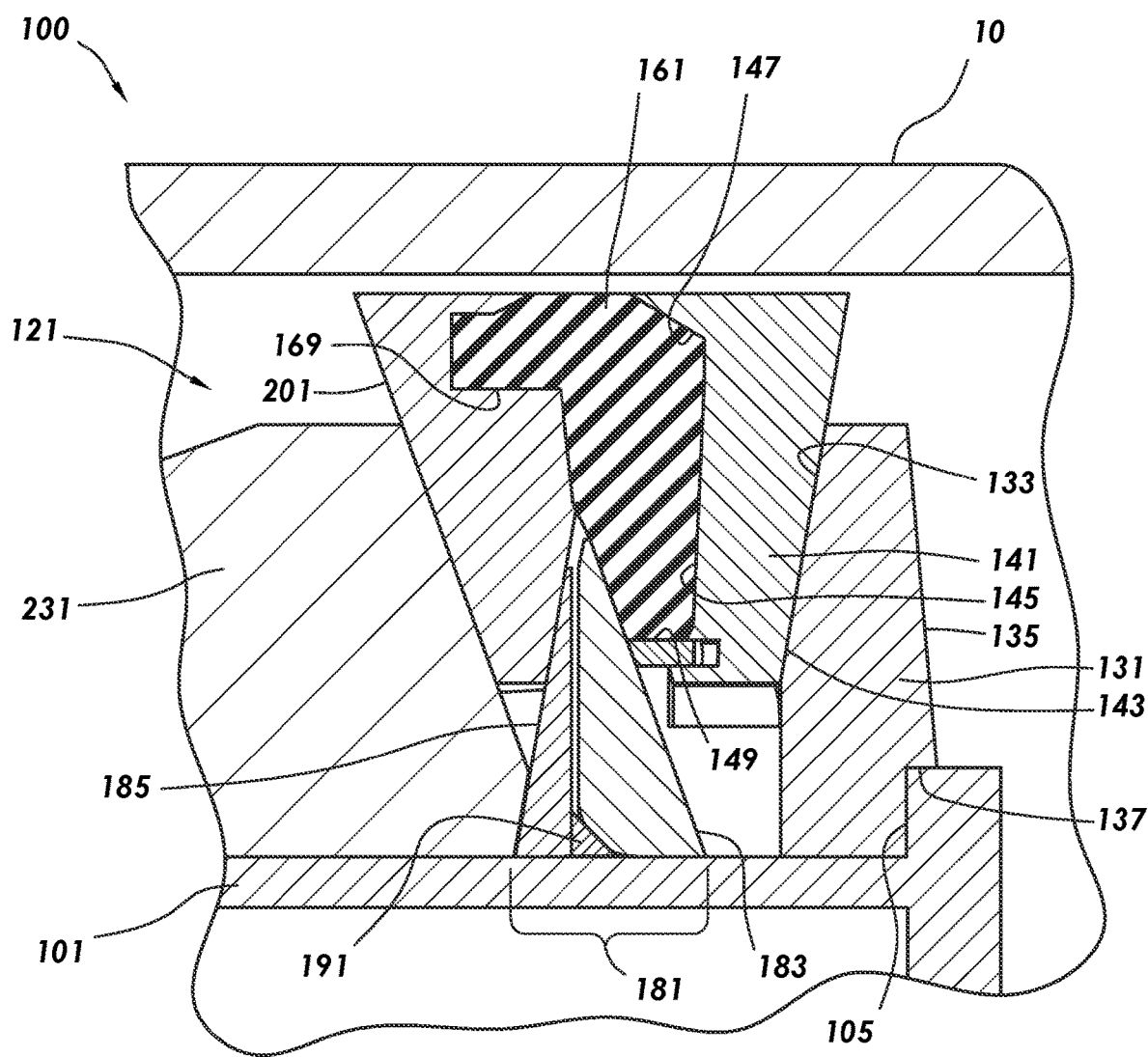

As bowl 231 moves further along plug body 101 toward fixed head 105, secondary tapered ring 201 is biased radially outward due to the taper angle of the interfaces between wedge face 233 of bowl 231 and wedge extension face 207 and between wedge squeezer face 203 and wedge face 189; primary seal ring 161 is biased radially outward due to the taper angle of the interface between squeezer face 165 and seal face 187; and primary tapered ring 141 is biased radially outward due to the taper angle of the interface between expansion face 143 and forcing face 133 as shown in FIG. 15. Because the taper angles of these interfaces are generally the same, the initial radial expansion of secondary tapered ring 201, primary seal ring 161, and primary tapered ring 141 is in a substantially radial direction with respect to the rest of seal assembly 121. Such an arrangement may, for example and without limitation, allow seal assembly 121 to be used with pipelines 10 of varying internal diameters.

Figure 16:
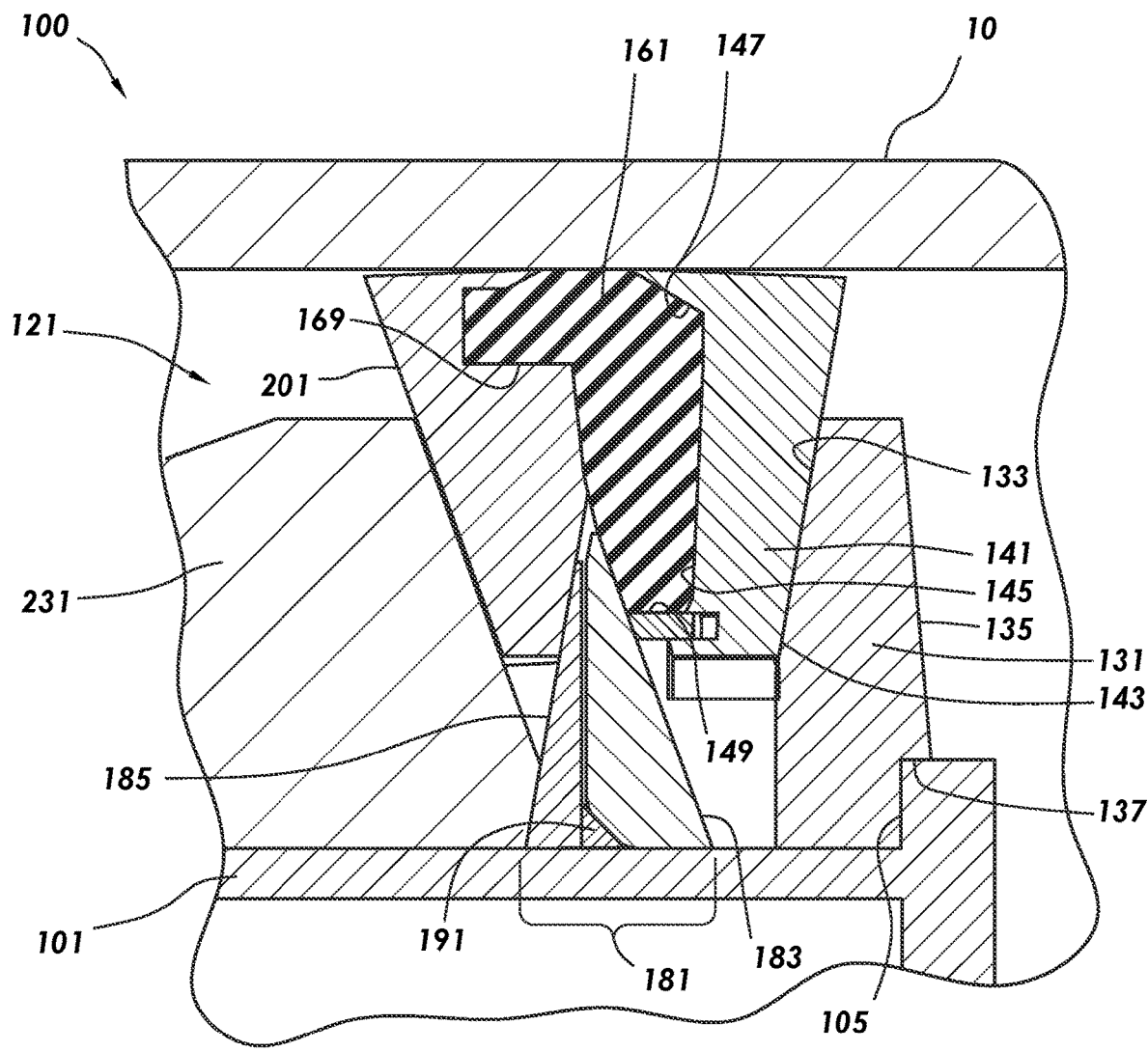

In some embodiments, as shown in FIG. 16, as secondary tapered ring 201 travels radially outward along small squeezer ring 185, wedge squeezer face 203 may engage with large squeezer ring 183. In some such embodiments, large squeezer ring 183 may include back cut 195 formed at a taper angle that corresponds with the angle of wedge squeezer face 203, thereby allowing further radial extension of secondary tapered ring 201 while maintaining engagement between secondary tapered ring 201 and small squeezer ring 185. In some embodiments, the contact between secondary tapered ring 201 and back cut 195 may act as a fulcrum to allow secondary tapered ring 201 to apply leverage to small squeezer ring 185 and thereby further compress inner seal 191.

Figure 17:
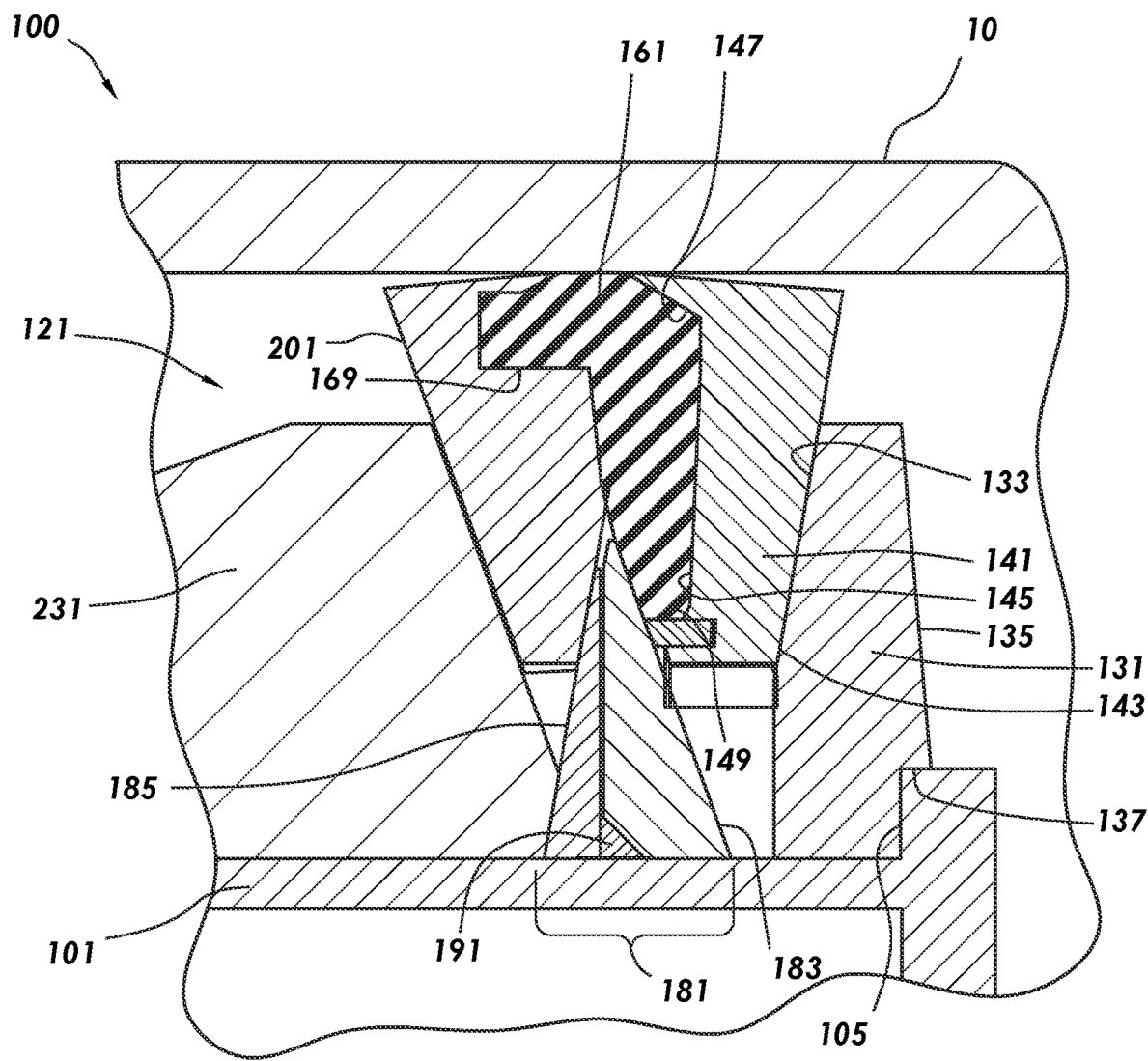

With reference to FIG. 17, as further longitudinal compressive force is applied to seal assembly 121, additional radial force is exerted between primary seal ring 161 and pipeline 10, between primary tapered ring 141 and primary seal ring 161, between secondary tapered ring 201 and primary seal ring 161, between primary seal ring and squeezer assembly 181, and between squeezer assembly and plug body 101 via inner seal 191, thereby increasing the deformation of primary seal ring 161 and inner seal 191 and, without being bound to theory, the ability of primary seal ring 161 and inner seal 191 to provide fluid isolation within pipeline 10.

In some embodiments, where a differential fluid pressure is applied across seal assembly 121, seal assembly 121 may be self-actuating where the higher pressure is on side of seal assembly 121 corresponding with pressure head 131, such that continuous compressive force applied by actuation mechanism 103 may not be required to maintain seal assembly 121 in the actuated position.

In some embodiments, in order to retract seal assembly 121, such differential fluid pressure may be equalized, and actuation mechanism 103 may be operated to move fixed head 105 and movable head 107 longitudinally apart. As primary seal ring 161 is formed from an elastomeric material elastically deformed radially outward during the actuation operation, primary seal ring 161 exerts a radially inward force on primary tapered ring 141 via seal lip 149 and on secondary tapered ring 201 via return pocket 205 through return flange 169. Such inward radial force may force pressure head 131 and bowl 231 longitudinally apart, allowing the components of seal assembly 121 to return to the initial run-in position.

The configuration of pressure head 131, primary tapered ring 141, primary seal ring 161, squeezer assembly 181, secondary tapered ring 201, and bowl 231 as indicated herein above is consistent with at least the embodiments so described. In some embodiments, the order of certain components within seal assembly 121 may be modified including, for example and without limitation, the repositioning of primary tapered ring 141 and secondary tapered ring 201 relative to pressure head 131 and bowl 231. In some embodiments, primary seal ring 161 may be configured in different positions than those described herein above.

Figure 19:
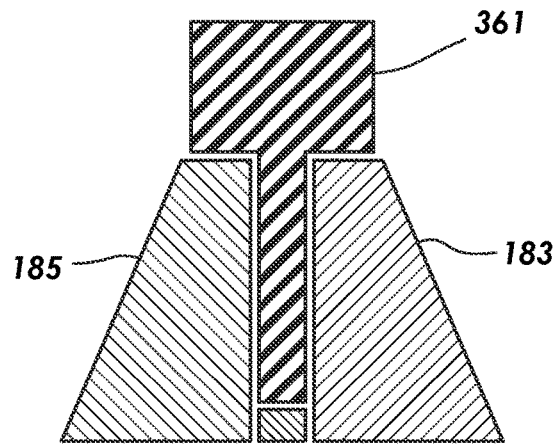

For example, FIG. 18 shows an embodiment in which primary seal ring 261 is positioned partially between large squeezer ring 183 and small squeezer ring 185. In such an embodiment, inner seal 191 as described herein above may be formed as part of primary seal ring 261. FIG. 19 shows an embodiment in which primary seal ring 361 is positioned partially between large squeezer ring 183 and small squeezer ring 185, wherein inner seal 191 is formed separately from primary seal ring 361.

Figure 20:
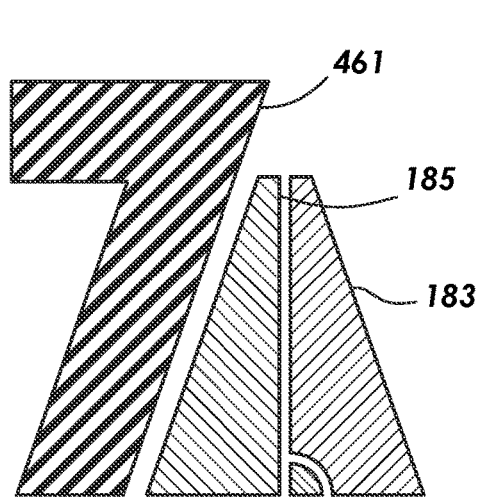
Figure 21:
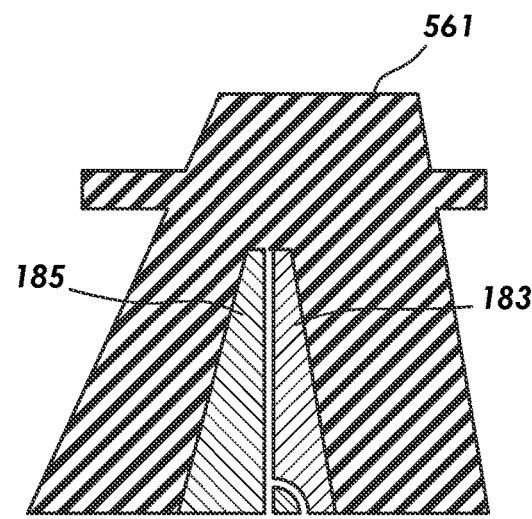

FIG. 20 depicts an embodiment in which primary seal ring 461 is positioned adjacent small squeezer ring 185 rather than large squeezer ring 183 as described with respect to above-discussed embodiments. FIG. 21 depicts an embodiment in which primary seal ring 561 is positioned about both small squeezer ring 185 and large squeezer ring 183.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A seal assembly comprising:
   a pressure head, the pressure head including a forcing face
   a primary tapered ring adapted for radial expansion during a setting operation of the seal assembly, the primary tapered ring including an expansion face, the expansion face abutting the forcing face;
   a primary seal ring;
   a squeezer assembly, the squeezer assembly including at least one seal face, the seal face abutting the primary seal ring;
   a secondary tapered ring, the secondary tapered ring including a wedge squeezer face, the wedge squeezer face abutting a wedge face of the squeezer assembly; and
   a bowl, the bowl including a wedge face, the wedge face in abutment with an expansion face of the secondary tapered ring.

2. The seal assembly of claim 1, wherein the pressure head includes a slot formed in the face opposite the forcing face, the slot being annular.

3. The seal assembly of claim 1, wherein the primary tapered ring comprises a plurality of primary tapered ring segments.

4. The seal assembly of claim 3, wherein each primary tapered ring segment includes a primary tapered ring rabbet, each primary tapered ring rabbet configured to slidingly engage a second primary tapered ring rabbet of an adjacent primary tapered ring segment.

5. The seal assembly of claim 1, wherein the primary seal ring is formed from an elastomeric material.

6. The seal assembly of claim 1, wherein the squeezer assembly comprises a large squeezer ring and a small squeezer ring, wherein the inner seal is positioned between the large squeezer ring and the small squeezer ring.

7. The seal assembly of claim 6, wherein the seal face is formed on the large squeezer ring and the wedge face is formed on the small squeezer ring.

8. The seal assembly of claim 6, wherein the seal face is formed on the small squeezer ring and the wedge face is formed on the large squeezer ring.

9. The seal assembly of claim 6, wherein the primary seal ring extends at least partially between the large squeezer ring and the small squeezer ring.

10. The seal assembly of claim 1, wherein the secondary tapered ring comprises a plurality of wedge segments.

11. The seal assembly of claim 10, wherein each wedge segment includes a wedge rabbet, each wedge rabbet configured to slidingly engage a second wedge rabbet of an adjacent wedge segment.

12. The seal assembly of claim 1, wherein the primary tapered ring includes a seal roof and a seal lip formed in the face opposite the expansion face, the seal roof and seal lip defining a seal pocket, wherein the primary seal ring is positioned at least partially within the seal pocket.

13. The seal assembly of claim 1, wherein the primary seal ring further comprises a return flange.

14. The seal assembly of claim 12, wherein the secondary tapered ring includes a return pocket, the return flange of the primary seal ring positioned at least partially within the return pocket.

15. The seal assembly of claim 1, wherein the squeezer assembly further includes an inner seal.

16. A pipeline plug comprising:
   a plug body, the plug body being tubular;
   an actuation mechanism, the actuation mechanism including a fixed head and a movable head, the fixed head coupled to the plug body; and
   a seal assembly positioned about the plug body between the fixed head and the movable head, the seal assembly including:
   a pressure head, the pressure head including a forcing face;
   a primary tapered ring adapted for radial expansion during a setting operation of the seal assembly, the primary tapered ring including an expansion face, the expansion face abutting the forcing face,
   a primary seal ring;
   a squeezer assembly, the squeezer assembly including a seal face, the seal face abutting the primary seal ring;

a secondary tapered ring, the secondary tapered ring including a wedge squeezer face, the wedge squeezer face abutting a wedge face of the squeezer assembly; and a bowl, the bowl including a wedge face, the wedge face in abutment with an expansion face of the secondary tapered ring.

17. The seal assembly of claim 16, wherein the pressure head includes a slot formed in the face opposite the forcing face, the slot receiving the fixed head, the slot being annular.

18. The seal assembly of claim 16, wherein the primary tapered ring comprises a plurality of primary tapered ring segments.

19. The seal assembly of claim 18, wherein each primary tapered ring segment includes a primary tapered ring rabbet, each primary tapered ring rabbet configured to slidingly engage a second primary tapered ring rabbet of an adjacent primary tapered ring segment.

20. The seal assembly of claim 16, wherein the primary seal ring is formed from an elastomeric material.

21. The seal assembly of claim 16, wherein the squeezer assembly comprises a large squeezer ring and a small squeezer ring, wherein the inner seal is positioned between the large squeezer ring and the small squeezer ring.

22. The seal assembly of claim 21, wherein the seal face is formed on the large squeezer ring and the wedge face is formed on the small squeezer ring.

23. The seal assembly of claim 21, wherein the seal face is formed on the small squeezer ring and the wedge face is formed on the large squeezer ring.

24. The seal assembly of claim 16, wherein the secondary tapered ring comprises a plurality of wedge segments.

25. The seal assembly of claim 24, wherein each wedge segment includes a wedge rabbet, each wedge rabbet configured to slidingly engage a second wedge rabbet of an adjacent wedge segment.

26. The pipeline plug of claim 16, wherein the movable head is movable relative to the fixed head by hydraulic pressure, pneumatic pressure, or electromechanically.

27. The pipeline plug of claim 16, wherein the primary tapered ring includes a seal roof and a seal lip formed in the face opposite the expansion face, the seal roof and seal lip defining a seal pocket, wherein the primary seal ring is positioned at least partially within the seal pocket.

28. The pipeline plug of claim 16, wherein the primary seal ring further comprises a return flange.

29. The pipeline plug of claim 28, wherein the secondary tapered ring includes a return pocket, the return flange of the primary seal ring positioned at least partially within the return pocket.

30. The pipeline plug of claim 16, wherein the squeezer assembly further includes an inner seal.

* * * * *